United States Patent
Yokonuma

(10) Patent No.: US 7,174,045 B2
(45) Date of Patent: Feb. 6, 2007

(54) IMAGE COMPRESSION APPARATUS, METHOD AND RECORDING MEDIUM STORING AN IMAGE COMPRESSION PROGRAM

(75) Inventor: Norikazu Yokonuma, Tokyo (JP)

(73) Assignee: Nikon Corporation, Tokyo (JP)

( * ) Notice: Subject to any disclaimer, the term of this patent is extended or adjusted under 35 U.S.C. 154(b) by 551 days.

(21) Appl. No.: 10/396,346

(22) Filed: Mar. 26, 2003

(65) Prior Publication Data

US 2004/0105585 A1    Jun. 3, 2004

Related U.S. Application Data

(63) Continuation of application No. 10/114,067, filed on Apr. 3, 2002, now abandoned, which is a continuation of application No. 09/861,552, filed on May 22, 2001, now abandoned, which is a continuation of application No. 09/088,365, filed on Jun. 2, 1998, now abandoned.

(60) Provisional application No. 60/057,680, filed on Aug. 29, 1997.

(30) Foreign Application Priority Data

Jun. 4, 1997    (JP) .................................. 9-146365

(51) Int. Cl.
*G06K 9/36*    (2006.01)
(52) U.S. Cl. ..................... 382/232; 382/233; 382/239; 382/250; 382/251; 382/305; 348/222.1; 348/607
(58) Field of Classification Search ................ 382/232, 382/233, 239, 240, 245, 246, 250, 251, 305; 348/222.1, 607, 64, 73, 231.1

See application file for complete search history.

(56) References Cited

U.S. PATENT DOCUMENTS 5,146,324 A    9/1992    Miller et al.

(Continued)

FOREIGN PATENT DOCUMENTS

JP    A 2-100487    4/1990

*Primary Examiner*—Jingge Wu
*Assistant Examiner*—Ali Bayat
(74) *Attorney, Agent, or Firm*—Oliff & Berridge, PLC

(57) ABSTRACT

An image compression apparatus and method, and a carrier wave encoded with a computer readable control program having instructions for use by a computer, perform an image compression process. A compression level is determined for use in compressing a picture image to a predetermined target data amount by iteratively compressing a reduced version of the picture image in order to determine the compression level that is to be used to compress the picture image. First, a reduced-size picture image is created from the picture image that is to be compressed. A preliminary compression target data amount is then derived, for example, based on the target data amount, the data amount of the picture image and the data amount of the reduced-size picture image. The reduced-size picture image is then compressed using a compression level. The size of the resulting compressed reduced-size picture image is compared to the preliminary compression target data amount. The compression level is then adjusted (raised or lowered) and compression of the reduced-size picture image is repeated until the resulting compressed reduced-size picture image satisfies the preliminary compression target data amount. The compression level that ultimately is derived, is then used to compress the picture image. The resulting compressed picture image will then satisfy the predetermined target data amount.

35 Claims, 17 Drawing Sheets

U.S. PATENT DOCUMENTS

| | | | |
|---|---|---|---|
| 5,357,281 A * | 10/1994 | Ikeda et al. | 375/240.12 |
| 5,706,097 A * | 1/1998 | Schelling et al. | 358/296 |
| 5,825,424 A * | 10/1998 | Canfield et al. | 375/240.15 |
| 5,926,218 A * | 7/1999 | Smith | 348/207.99 |
| 5,966,122 A | 10/1999 | Itoh | |
| 5,966,465 A | 10/1999 | Keith et al. | |
| 5,991,783 A | 11/1999 | Popa et al. | |
| 5,999,189 A * | 12/1999 | Kajiya et al. | 382/232 |
| 6,002,794 A | 12/1999 | Bonneau et al. | |
| 6,020,920 A | 2/2000 | Anderson | |
| 6,233,359 B1 * | 5/2001 | Ratnakar et al. | 382/250 |
| 6,545,687 B2 * | 4/2003 | Scott et al. | 345/629 |

* cited by examiner

IMAGE COMPRESSION APPARATUS, METHOD AND RECORDING MEDIUM STORING AN IMAGE COMPRESSION PROGRAM

RELATED PROVISIONAL APPLICATION

This is a Continuation of application Ser. No. 10/114,067 filed Apr. 3, 2003 now abandoned, which in turn is a Continuation of application Ser. No. 09/861,552 filed May 22, 2001 now abandoned which in turn is a Continuation of application Ser. No. 09/088,365 filed Jun. 2, 1998 now abandoned. The entire disclosure of the prior application(s) is hereby incorporated by reference herein in its entirety.

This nonprovisional application claims the benefit of Provisional Application No. 60/057,680, filed Aug. 29, 1997.

INCORPORATION BY REFERENCE

The disclosure of the following priority application is herein incorporated by reference: Japanese Patent Application No. 9-146365, filed Jun. 4, 1997.

BACKGROUND OF THE INVENTION

1. Field of Invention

The present invention relates to an image compression apparatus that compresses an image, particularly a picture image, and to a compression method and recording medium storing a computer readable compression program.

2. Description of Related Art

In recent years, there have been great advances in image compression technology to compress digital image compression signals. For example, compression methods such as the JPEG (Joint Photographic Experts Group) and the MPEG (Moving Picture Experts Group) methods are known, international standards for compressing digital still picture images and moving picture images.

These compression methods perform picture image compression by performing the following processes in the order: Discrete Cosine Transformation (DCT), followed by linear quantization, followed by variable-length coding.

Picture image compression first divides the picture image into blocks of, for example, 8×8 picture elements, and directly transforms each block of the picture image using DCT. The DCT separates the picture image signal into the portion that is necessary for viewing (that portion of the picture image having low frequency components), and into the portion that is not necessary for viewing (that portion of the picture image having high frequency components).

Next, quantization is performed by means of frequency weighted quantization. Frequency weighted quantization is a method that quantizes by changing the quantization amount in accordance with the frequency. Since the picture image data is transformed into frequency coefficients by the DCT, for example, the quantization amount is increased for the high frequency components that are not necessary for viewing, thereby reducing the data amount. The quantization amount is made smaller for the low frequency components that are necessary for viewing, thereby controlling the deterioration of the picture image.

Next, variable length code (VLC) such as, for example, Huffman encoding or so forth is applied. Huffman encoding, by assigning variable length code according to the frequency by which data is generated, encodes by assigning code with the shortest bit length to the data with the highest frequency of occurrence, thereby reducing the data amount.

With the picture image compression processing described above, the compression efficiency varies according to the amount of spatial redundancy of the particular picture image. In other words, a picture image having high spatial redundancy (for example, a natural picture image with low contrast) is appropriate for picture image compression because it can attain high compression efficiency. On the other hand, a picture image having little or no spatial redundancy (for example, computer graphics with high contrast) is not suitable for picture image compression because the compression efficiency (using JPEG or MPEG, for example) is low.

Depending upon the amount of this type of spatial redundancy, the post-compression file size varies greatly even when undergoing the compression process at the same compression level.

The electronic still camera is one primary example of a device that can suffer from this ill effect. The electronic still camera compresses a photographed picture image, input by means of a CCD, and records it in non-volatile memory. Normally, it is possible to compress and record several 10 s of photographic picture images (e.g., 20–60 images). However, when the post-compression file size varies greatly for each photographic picture image, it becomes impossible to know with certainty how many picture images can be recorded in a particular memory.

For this purpose, electronic still cameras have been proposed to unify and record the post-compression file size. With these cameras, a picture image undergoes compression processing so as to become a standard file size. For example, in the case of compressing a photographic picture image so as to have a unified file size of 100 KB, first, compression processing is performed at a certain compression level. If the compression result is larger than 100 KB, the compression level is raised and the compression process is repeated. If the compression result is smaller than 100 KB, then the compression level is lowered and the compression process is repeated.

By repeating the compression process by appropriately changing the compression level in this way, the photographic picture image is compressed to a standard file size. However, generally, since the file size of a photographic picture image is large, the computation time of compression processing is increased, creating a problem in that a long time is required until the photographic picture image can be compressed to the standard size.

SUMMARY OF THE INVENTION

The invention relates to an image compression apparatus and method, and to a carrier wave (that can be recorded, for example, on a recording medium) encoded with a computer readable control program having instructions for use by a computer to perform the image compression process. According to one aspect of the invention, a compression level is determined for use in compressing a picture image to a predetermined target data amount by iteratively compressing a reduced version of the picture image in order to determine the compression level that is to be used to compress the picture image.

First, a reduced-size picture image is created from the picture image that is to be compressed. The reduced-size picture image has some, but not all, of the picture elements from the picture image. Thus, the reduced-size picture image has fewer picture elements than the picture image. The reduced-size picture image can be created by extracting a field picture image from the full-size (or frame) picture image and/or by producing a thumbnail picture image from the full-size picture image.

A preliminary compression target data amount is then derived, for example, based on the target data amount, the data amount of the picture image and the data amount of the reduced-size picture image. For example, the preliminary compression target data amount can be derived by multiplying the target data amount by a ratio between the size of the reduced-size picture image and the full-size picture image.

The reduced-size picture image is then compressed using a compression level. The size of the resulting compressed reduced-size picture image is then compared to the preliminary compression target data amount. The compression level is then adjusted (raised or lowered) and compression of the reduced-size picture image is repeated until the resulting compressed reduced-size picture image satisfies the preliminary compression target data amount.

The compression level that ultimately is derived, is then used to compress the picture image. The resulting compressed picture image will then satisfy the predetermined target data amount.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
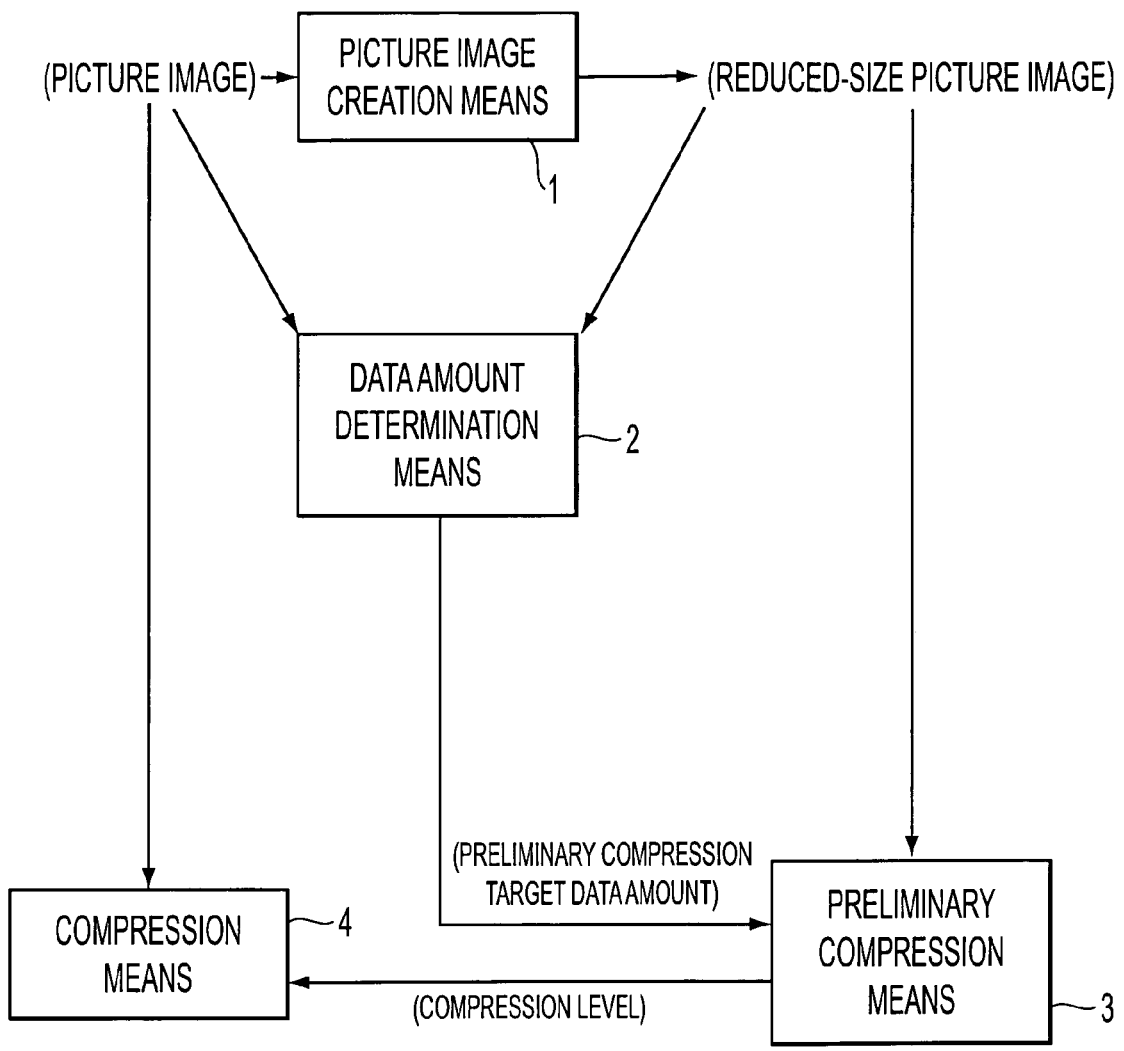
FIG. 1 is a high-level functional diagram of one aspect of the invention.

FIG. 1 is a high-level representation of one aspect of the invention. An electronic camera includes a number of functional portions or sub-sections, referred to in FIG. 1 as "means." As will become clear from the ensuing description, each means is not necessarily a separate or separable unit or component of the camera. There can be overlap between the actual structure and software of the camera that performs (or corresponds to) the various means. For example, a single microprocessor can function as parts of (or all of) more than one of the illustrated means. Alternatively, it is possible to use separate, dedicated microprocessors for each means that relies on microprocessor control.

One aspect of the invention relates to a picture image compression apparatus that compresses the data of a picture image to a predetermined target data amount. A picture image creation means 1 creates, from a picture image (e.g., a digital image input through a CCD), a reduced-size picture image having a reduced number of picture elements compared to the picture image. A data amount determination means 2 derives, using the target data amount, a preliminary compression target data amount, which is the target data amount of the reduced-size picture image. A preliminary compression means 3 derives a compression level when the data amount of the compressed reduced-size picture image matches the preliminary compression target data amount. Preliminary compression means 3 derives the compression level by repeating a compression operation after changing the compression level for compressing the data of the reduced-size picture image until the preliminary compression target data amount is reached. Then, compression means 4 compresses the data of the picture image to the target data amount according to the compression level derived from the preliminary compression means 3.

The picture image creation means 1 can create a field picture image as the reduced-size picture image from a frame picture image. The picture image creation means 1 can create a thumbnail picture image as the reduced-size picture image in order to display the thumbnail picture image in a single-view display.

Another aspect of the invention relates to a method of compressing a picture image and to a carrier wave encoded with a computer readable program that includes instructions for causing a computer to compress a picture image as detailed above. The carrier wave can be recorded on a recording medium such as, for example, a CD ROM. The program includes a number of instructions. One instruction is to create from a picture image, a reduced-size picture image having a reduced number of picture elements compared to the picture image. Another instruction is to derive a preliminary compression target data amount, which is the post compression data amount of the reduced-size picture image. This is derived using a predetermined target data amount, which is the post-compression data amount of the picture image, and by comparing the data amount of the picture image and the data amount of the reduced-size picture image. Another instruction is to derive a compression level when the post-compression data amount of the compressed reduced-size image matches the preliminary compression target data amount. The compression level is derived by repeating compression after changing the compression level for the data of the reduced-size picture image. A final instruction is to compress the data of the picture image to the target data amount according to the derived compression level.

With the picture image compression apparatus and method outlined above, first the picture image creation means 1 creates the reduced-size picture image, which has a reduced number of picture elements from the picture image. This is done before compressing the data of the picture image.

The data amount determination means 2 then derives the preliminary compression target data amount, which is the target data amount for compression of the reduced-size picture image. The preliminary compression target data amount is derived from the target data amount of the picture image according to the ratio of the picture image to the reduced-size picture image. However, the data amount determination means 2 may also derive this amount directly, or it may be calculated by another means and set in advance into the data amount determination means 2.

The preliminary compression means 3 changes the compression level relative to the data of the reduced-size picture image, and repeats execution of the compression process (of the reduced-size picture image) until it derives the final compression level, which is the compression level at the time that the data of the reduced-size picture image is compressed to a size corresponding to the preliminary compression target data amount.

The compression means 4 executes, according to the final compression level, the main compression (of the picture image) so that the data of the picture image becomes compressed to the predetermined target data amount.

According to one option, the picture image creation means 1 extracts the field picture image as a reduced-size picture image from the frame picture image by means of a thinning process of the picture image data. For example, every other scan line can be ignored (thinned out).

According to another option, the picture image creation means 1 creates the reduced-size picture image by producing a thumbnail picture image in order to display the picture image as a single-view display.

Figure 2:
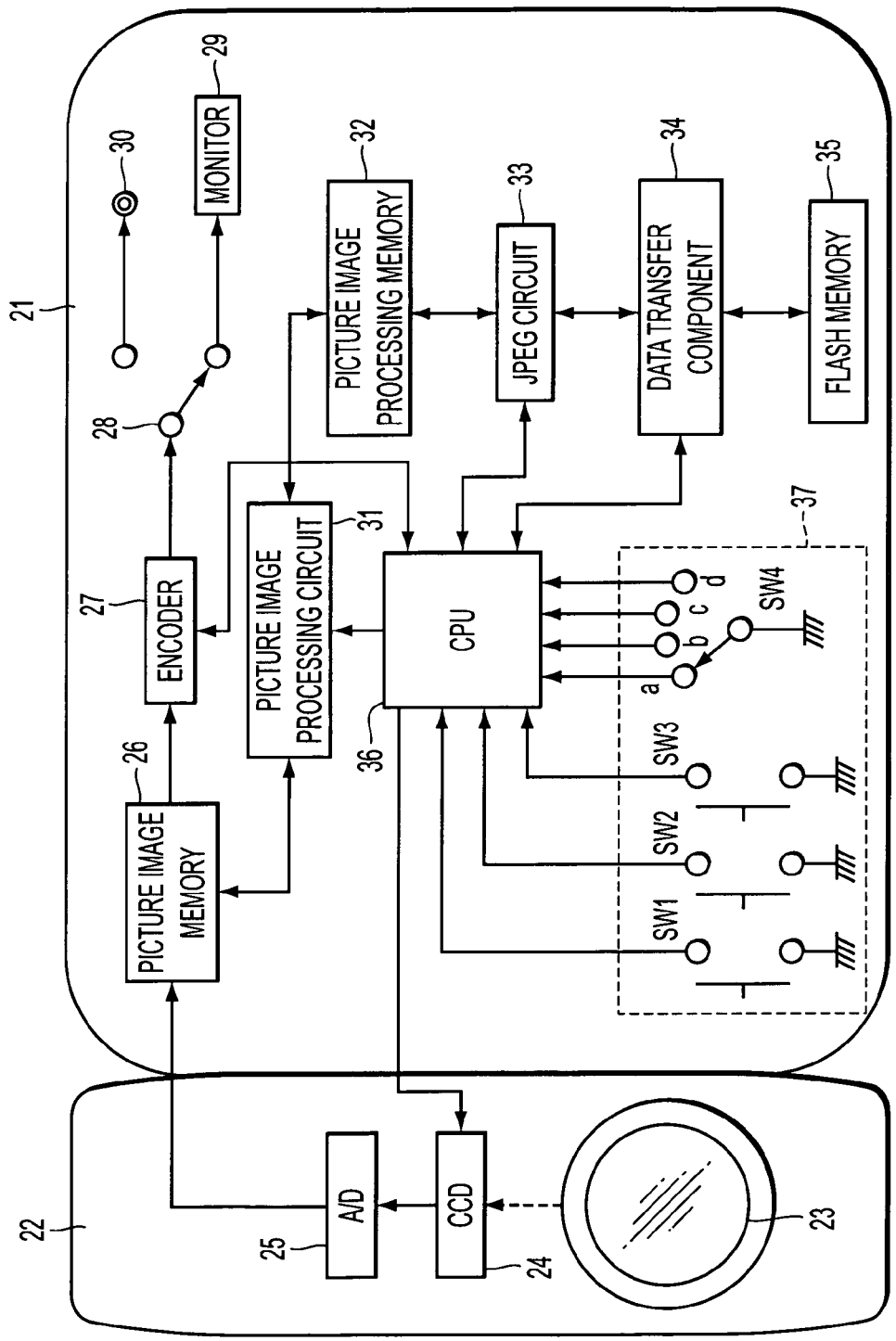
FIG. 2 is a block diagram of a camera according to a first embodiment of the invention.
Figure 3:
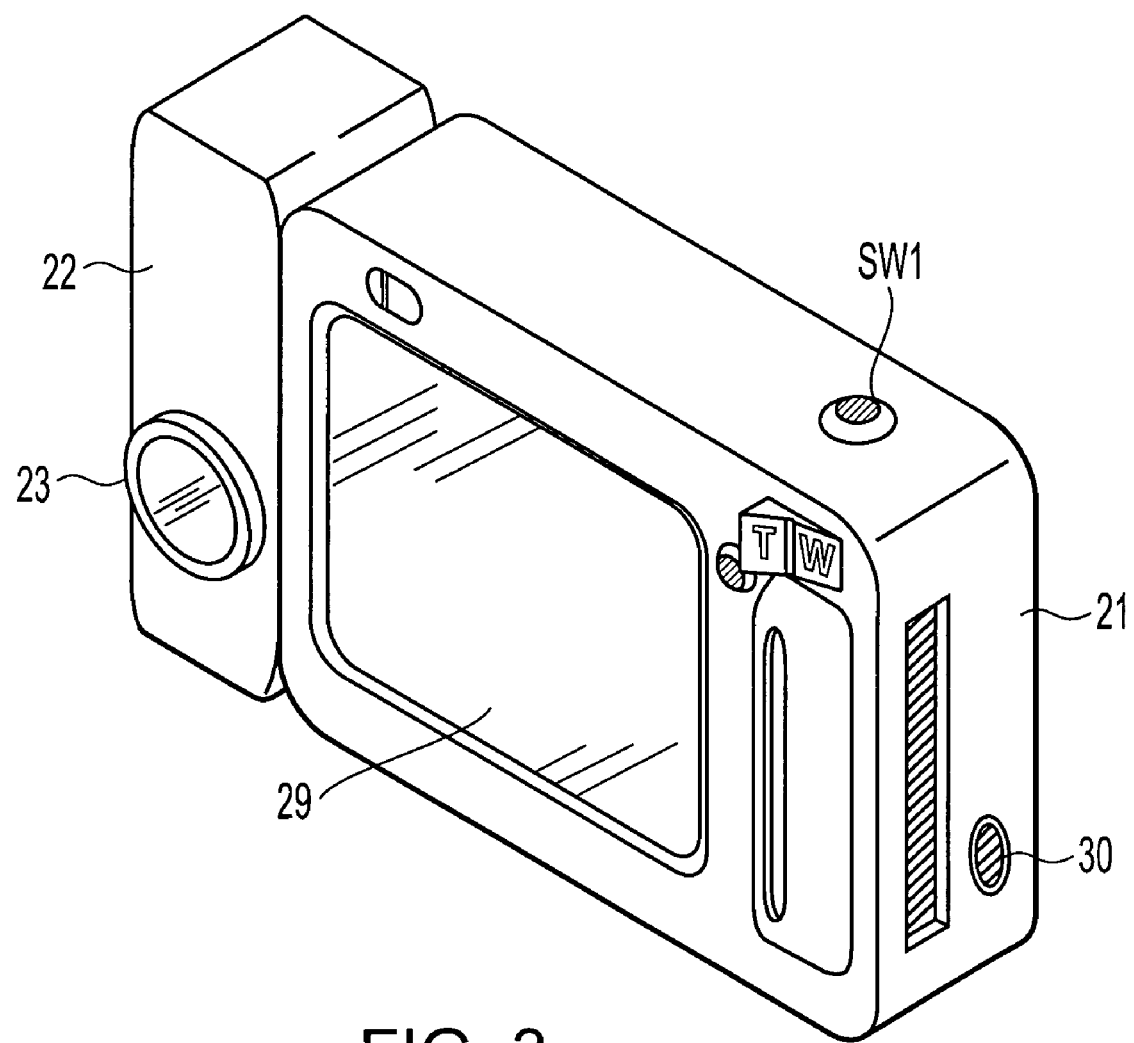
FIG. 3 is a perspective view of the FIG. 2 camera.
Figure 4:
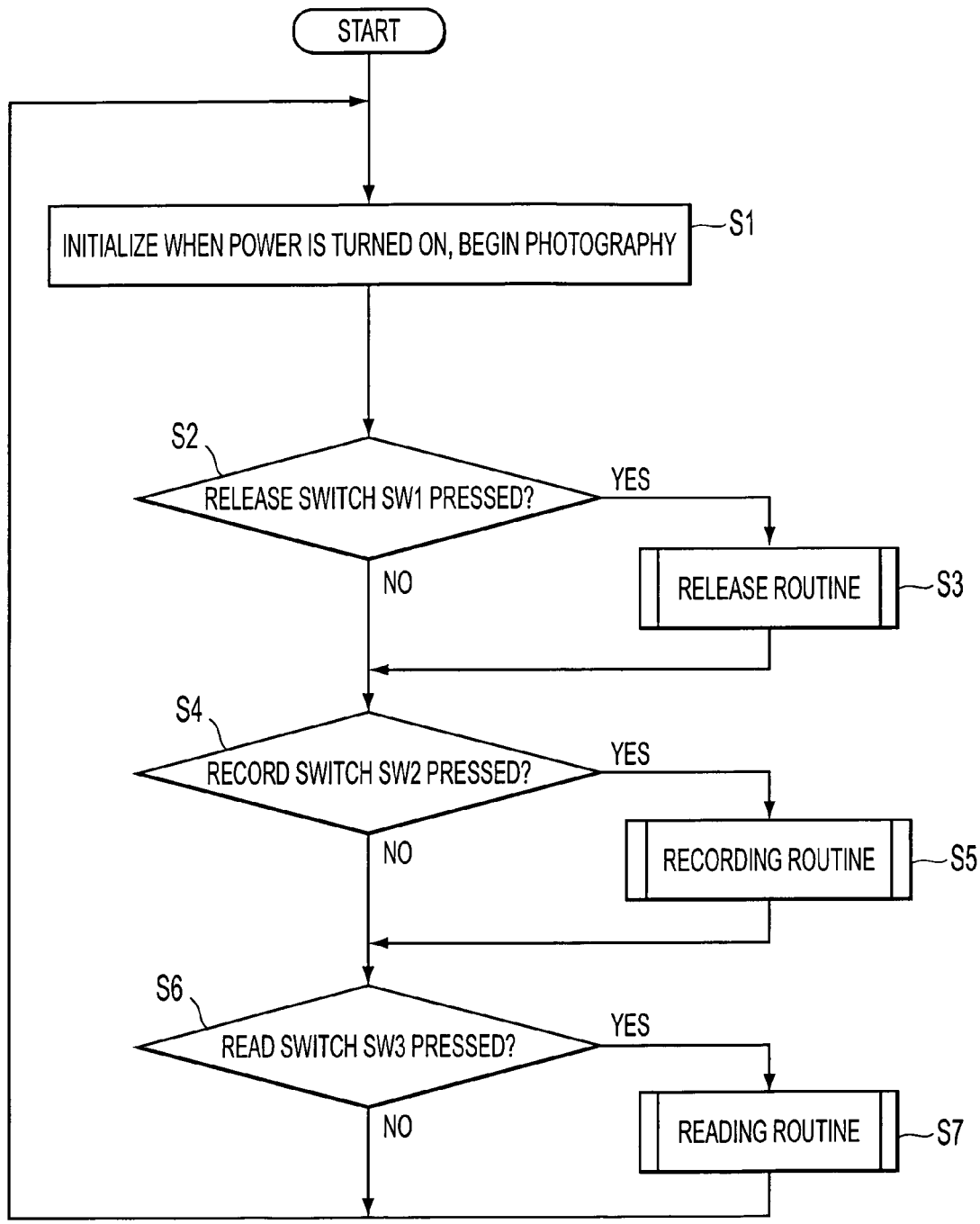
FIG. 4 is a flow chart of a main routine performed by a camera of the first embodiment.
Figure 5:
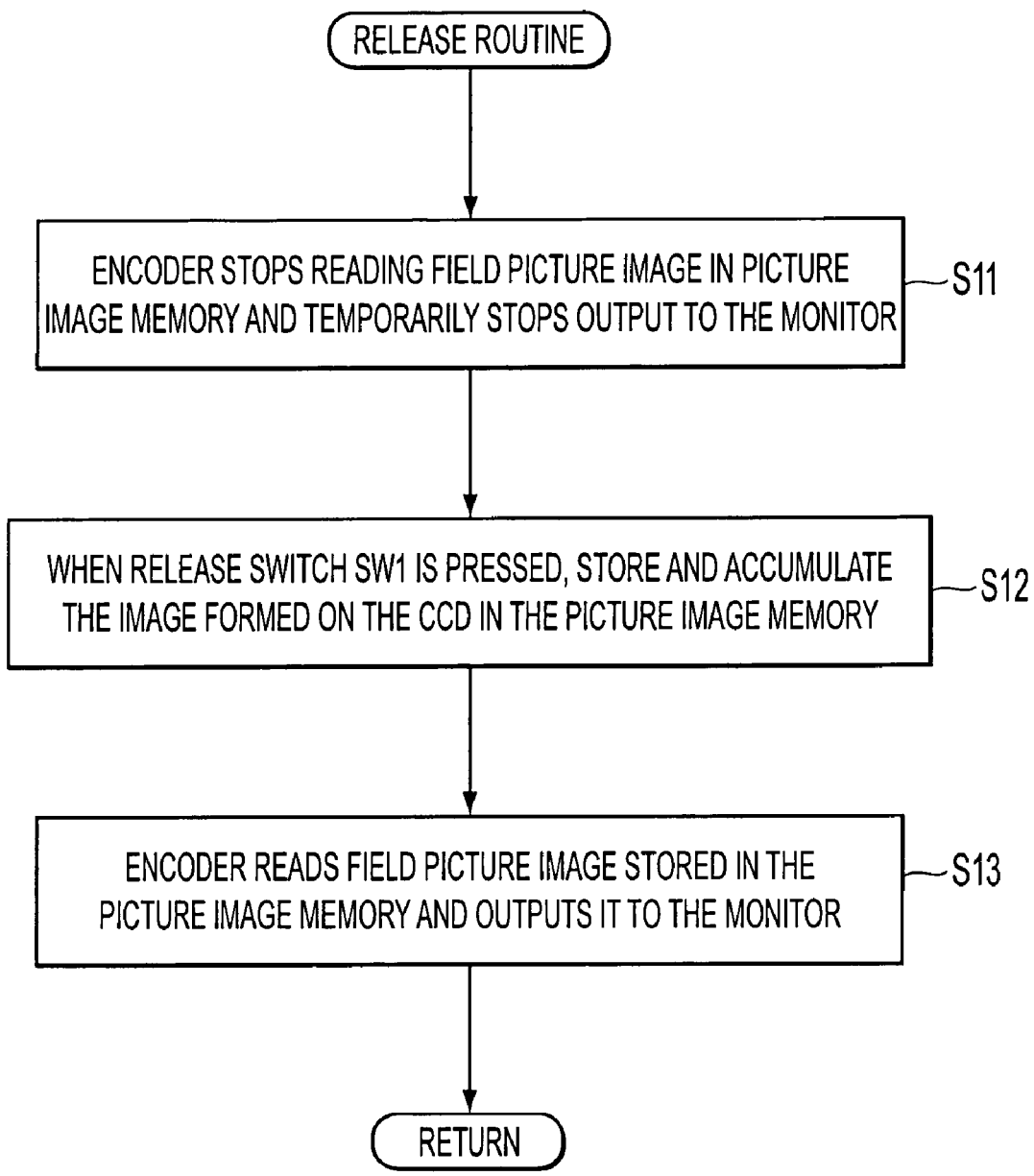
FIG. 5 is a flow chart of a release routine performed by a camera of the first embodiment.

Embodiments of the present invention are described hereafter with reference to the drawings. In the present embodiment, an example of an electronic still camera will be given as a description of a device that uses the picture image compression apparatus of the present invention. FIG. 2 is a block diagram of an electronic still camera that is a first embodiment of the invention. FIG. 3 is a perspective view of the camera of the first embodiment.

In FIG. 2, the main body 21 is connected to a camera component 22. The internal components of the camera component 22 include a photographic lens 23 and a CCD sensor 24 arranged in a position to receive transmitted light of the photographic lens 23. The photo-electric signal of the CCD sensor 24 is input, through an A/D converter 25, into a picture image memory 26, which is arranged within the main body 21.

The output of the picture image memory 26 is input through an encoder 27 into a video selection switch 28. The output of the video selection switch 28 is input into a monitor 29 or into a video terminal 30.

Meanwhile, the input/output terminal of the picture image memory 26 is connected to a first input/output terminal of a picture image processing circuit 31, which is arranged within the main body 21. A second input/output terminal of the picture image processing circuit 31 is connected to an input/output terminal of a picture image processing memory 32.

The picture image processing memory 32 is connected to a flash memory 35 through a JPEG circuit 33 and a data transfer component 34. Flash memory 35 can be a card type of memory that has the ability to be attached and removed freely from the main body 21.

Picture image data can be transferred in both directions between the picture image processing memory 32 and the flash memory 35.

CPU 36 also is arranged within the main body 21. The control signal of the CPU 36 is input into the CCD sensor 24, the encoder 27, the picture image processing circuit 31, the JPEG circuit 33 and the data transfer component 34. In addition, the output signals of the JPEG circuit 33, the data transfer component 34 and the operation switch 37 are input into the CPU 36.

The corresponding relationship between the high-level representation of FIG. 1 and the first embodiment is as follows. The picture image creation means 1 corresponds to the CCD sensor 24, the A/D converter 25 and the picture image memory 26. The data amount determination means 2 corresponds to the CPU 36. The preliminary compression means 3 corresponds to the JPEG circuit 33. The compression means 4 also corresponds to the JPEG circuit 33.

Figure 9:
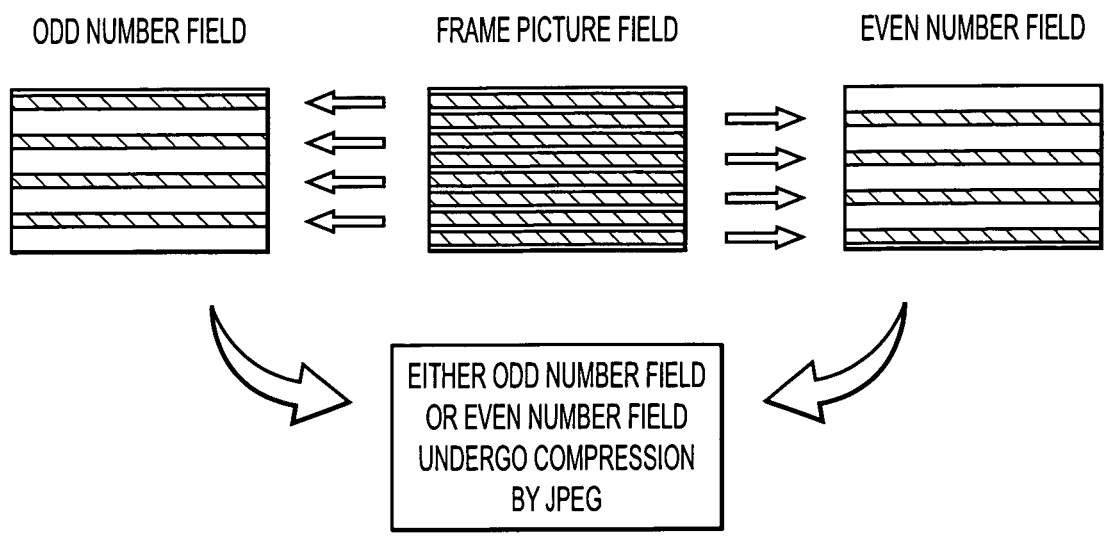
FIG. 9 illustrates the picture image compression process of the first embodiment.

A description of the operation of the first embodiment is provided hereafter, with reference to the drawings. FIG. 4 through FIG. 7 are flow charts describing the operation of the first embodiment. In addition, FIG. 9 illustrates the picture image compression process of the present embodiment.

When the power switch (not shown in the figure) is switched ON, the CPU 36 executes the following operation according to the camera sequence program stored in internal ROM. The CPU 36 initializes the system after clearing the picture image memory 26 and the picture image processing memory 32. The start photography command is input from the CPU 36 into the CCD sensor 24 and photography begins (step S1 of FIG. 4).

The photographic object obtained through the photographic lens 23 is formed on the CCD sensor 24 and converted photo-electrically. The photo-electric signal, by reading every other scanning line includes two field signals in a time series as is well known. In other words, an even number field signal and an odd number field signal that have a reduced number of picture elements in the vertical direction are output. These signals together comprise, in the same manner as the video signal, one frame of image data. The one frame has two fields, one with an even number field signal and one with an odd number field signal.

The A/D converter 25 increases the width of the even number field signal and the odd number field signal respectively, and then converts them to a digital video signal. In the picture image memory 26, the digital video signal is accumulated in the order received, and hence the even number field picture image and the odd number field picture image are created.

The encoder 27 chronologically reads the even number field picture image and the odd number field picture image that are stored in the picture image memory 26, and then D/A converts them to an analog projected image signal, and outputs them to the video terminal 30 or to the monitor 29 that is selected by the video selection switch 28.

In this instance, the monitor 29 is selected. The monitor 29, which is, for example, a liquid crystal display monitor, A/D converts the analog projected image signal, combines the even number field picture image and the odd number field picture image, integrates the frame picture image and performs display by means of the active matrix method.

Through the operation described above, the picture image is taken-in regularly and is chronologically displayed on the monitor 29.

In this state, the CPU 36 determines whether the release switch SW1 of the operation switch 37 has been pressed. If the release switch SW1 is pressed (step S2 in FIG. 4), the following release routine is executed (step S3 in FIG. 4).

The CPU 36 outputs the stop output command of the analog projected image signal to the encoder 27. The encoder 27 stops reading the field picture image that is stored in the picture image memory 26, and temporarily stops the output of the analog projected image signal to the monitor 29 (step S11 in FIG. 5). Next, at the moment that the release switch SW1 is pressed, the image formed on the CCD sensor 24 is photo-electrically converted and accumulated to the picture image memory 26 through the A/D converter 25 (step S 12 in FIG. 5). The CPU 36 outputs the restart output command of the analog projected image signal to the encoder 27, and the encoder 27 reads the even number field picture image and the odd number field picture image that are stored in the picture image memory 26, and A/D converts each to the analog projected image signal, and then outputs this to the monitor 29 (step S13 in FIG. 5).

According to the operation described above, the operator has the ability to take in a picture image at the moment there is a photographic opportunity by pressing the release switch SW1.

Next, a description of the operation that records the taken picture image into the flash memory 35 will be described hereafter.

The CPU 36 determines whether the recording switch SW2 of the operation switch 37 is pressed. When the recording switch SW2 is pressed (step S4 of FIG. 4), the following recording routine is executed (step S5 in FIG. 4).

Figure 6:
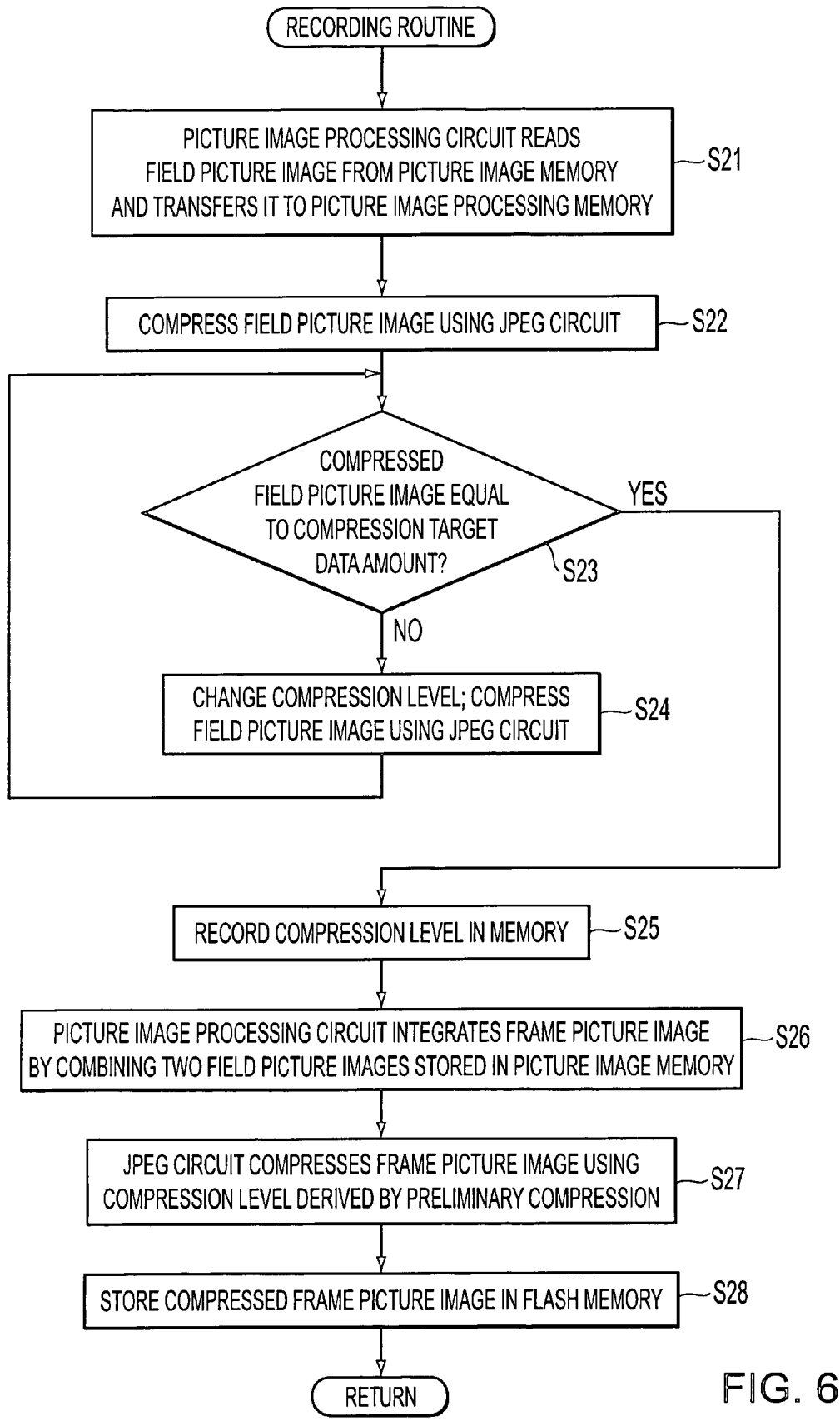
FIG. 6 is a flow chart of a recording routine performed by a camera of the first embodiment.

The picture image processing circuit 31, in accordance with the field picture image reading command supplied from the CPU, reads one of the fields (either the even number field picture image or the odd number field picture image) that are accumulated in the picture image memory 26, and transfers it to the picture image processing memory 32 (step S21 of FIG. 6).

The CPU 36, for example, can be set in advance so as to compress a several MB (megabyte) frame picture image to a target data amount of about 100 KB (kilobytes). In addition, since the field picture image becomes the data amount of ½ of the frame picture image, the CPU 36 can be set in advance so as to compress the field picture image to a preliminary compression target data amount of 50 KB. The JPEG circuit 33 repeats the compression process until the field picture image that is stored in the picture image processing memory 32 becomes the preliminary compression target data amount.

Figure 8:
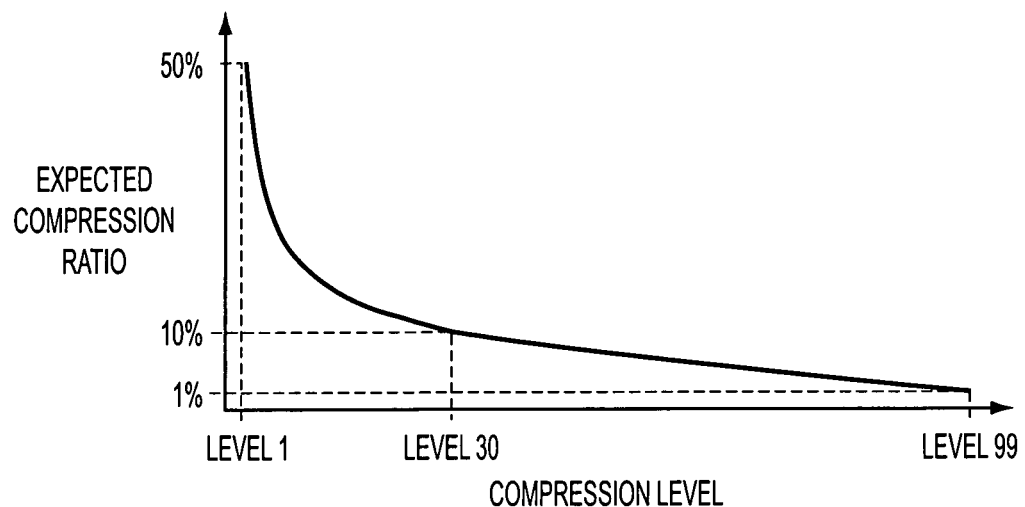
FIG. 8 illustrates the relationship between the compression level and the expected compression ratio.

In this instance, a description of a specific numerical value will be given relative to the preliminary compression process. For example, the data amount of the field picture image is 500 KB (with a frame picture image of 1 MB). Stored in advance in the internal ROM of the JPEG circuit 33 is the relationship between the compression ratio that is expected (hereafter referred to as the expected compression ratio) and the compression level that the standard picture image is subject to. A graph of this is shown in FIG. 8. In this instance, the expected compression ratio that corresponds to the compression levels 1 through 99 is indicated.

A preliminary compression target data amount and a preliminary compression initiation command are transferred from the CPU 36 to the JPEG circuit 33. The JPEG circuit 33, in accordance with such command, reads the field picture image that is stored in the picture image processing memory 32 and begins the compression. In particular, JPEG circuit 33 reads the data amount of the field picture image that is stored in the picture image processing memory 32 and compresses such data amount so that it matches the preliminary compression target data amount. In this instance, since a 500 KB data amount must be compressed so as to become 50 KB, first, compression is performed at a compression level of 30 (expected compression ratio 10%). The picture image compression is performed by performing the following procedure in the following order: DCT, followed by linear quantization, followed by variable length coding (step S22 in FIG. 6). JPEG circuit 33 repeats the compression process by changing the compression level until the compression result is within a range of 50 KB± an allowable value, thereby deriving the compression level when arriving within this range (steps S23 and S24 of FIG. 6).

For example, when the compression result is 40 KB, since the compression level is too large and there is the possibility that the picture image will deteriorate upon reproduction, the compression level is lowered. In this instance, this is derived by the following expression (1):

(Expected compression ratio for the next time)=(the expected compression ratio of the previous time)×(preliminary compression target data amount)/(data amount of the compression result of the previous time)     (1)

According to expression (1), an expected compression ratio for the next time is computed to be 12.5%, and the JPEG circuit 33 performs compression again at the compression level that corresponds to the expected compression ratio. It then determines whether the compression result has become 50 KB.

In addition, when the compression result is 60 KB, since the compression level is too small, an expected compression ratio of 8.3% is computed. Then, the compression is performed again at the compression level that corresponds to this expected compression ratio, and it is determined whether the compression result has become 50 KB.

The change of the compression level can be executed by changing the quantization amount. More specifically, in the internal ROM of the JPEG circuit 33, a quantization table of differing quantization amounts is prepared in advance for each compression level, and this quantization table is appropriately used.

The JPEG circuit 33 repeats the feed back process described above, and the compression level that compresses the field picture image to the preliminary compression target data amount is derived and transferred to the CPU 36. The CPU 36 stores that compression level in the internal memory (step S25 of FIG. 6).

Next, the picture image processing circuit 31, by means of the frame picture image creation command from the CPU 36, reads the even number field picture image and the odd number field picture image that are accumulated in the picture image memory 26, and integrates the frame picture image from the combined two field picture images (step S26 of FIG. 6)

The picture image processing circuit 31 transfers the frame picture image to the picture image processing memory 32. The JPEG circuit 33, according to the start main compression command from the CPU 36, performs the compression by reading the frame picture image from the picture image processing memory 32. At this time, the JPEG circuit 33, according to the compression level derived by the preliminary compression, compresses the frame picture image (step S27 of FIG. 6). Since the extent of the spatial redundancy of the frame picture image and the field picture image are nearly identical, the compression level of the field picture image can comply with the frame picture image.

Accordingly, when compression occurs at this compression level, the frame picture image is compressed to the target data amount.

The frame picture image that is compressed to the target data amount is read and recorded to the flash memory 35 through the data transfer component 34 as a compressed picture image file (step S28 of FIG. 6). At this time, the compression level at the time of compression is recorded in the header area of the compressed picture image file, together with the identification name of the file.

According to the operation described above, a taken picture image can be recorded to the flash memory 35.

A description of the operation for reading and reproducing a picture image that has been recorded in the flash memory 35 will now be provided. The CPU 36 determines whether the read switch SW3 of the operation switches 37 is pressed, and when the read switch SW3 is pressed (step S6 of FIG. 4), the read routine, to be described hereafter, is executed (step S7 of FIG. 4).

As an example, assume the four compressed picture image files a through d are recorded in the flash memory 35. One of the compressed picture image files is selected by use of the picture image selection switch SW4. The CPU 36 reads the selected compressed picture image file from the flash memory 35 through the data transfer component 34 and transfers it to the picture image processing memory 32 (step S31 of FIG. 7). At this time, the CPU 36 reads the compression level used at the time of compression from the header area of the compressed picture image file.

The start expansion (decompression) command and the compression level information of the compressed picture image file are transferred from the CPU 36 to the JPEG circuit 33, where the JPEG circuit 33 performs the expansion process of the compressed picture image according to the following procedure in the following order: variable length decoding, followed by reverse quantization, followed by reverse DCT (step S32 of FIG. 7). At this time, the JPEG circuit 33, for reverse quantization, executes the expansion process that corresponds to the compression level used by the quantization table that was used at the time of quantization.

The frame picture image that is restored (decompressed) by the JPEG circuit 33 is stored in the picture image processing memory 32. The CPU 36 outputs the stop output command of the analog projected image signal to the encoder 27. The encoder 27, according to such command, stops the reading of the field picture image that is stored in the picture image memory 26, and the output of the analog projected image signal is stopped to the monitor 29 (step S33 of FIG. 7).

Figure 7:
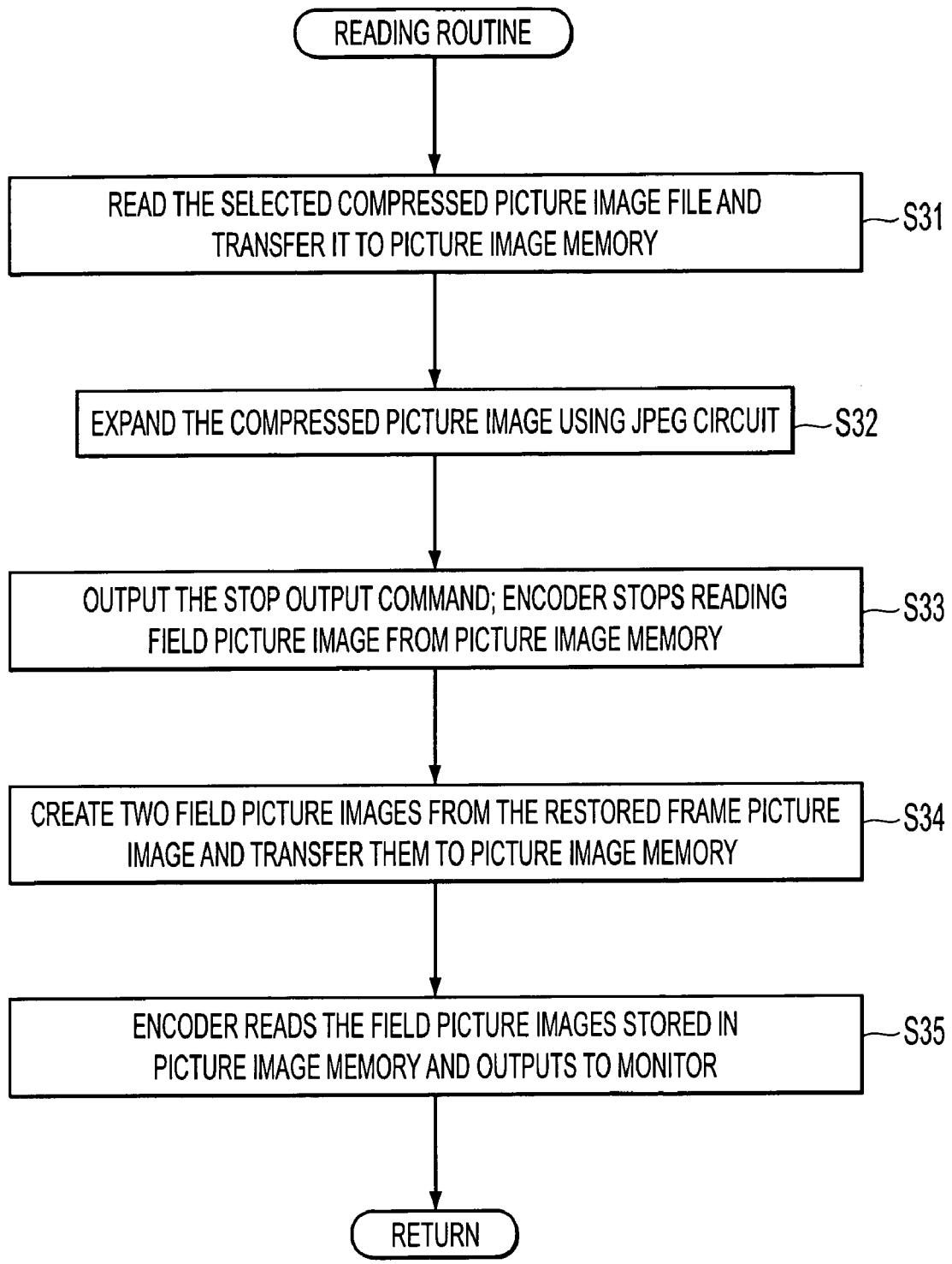
FIG. 7 is a flow chart of a read routine performed by a camera of the first embodiment.

The picture image processing circuit 31 divides the restored frame picture image into an even number field picture image and an odd number field picture image, thereby creating two picture image fields, which are transferred to the picture image memory 26 (step S34 of FIG. 7). The encoder 27, by means of the restart output command of the analog projected image signal from the CPU 36, reads the even number field picture image and the odd number field picture image that are stored in the picture image memory 26, and D/A converts these to a sequential analog projected image signal, which is output to the monitor 29 (step S35 of FIG. 7).

According to the process described above, the compressed picture image is restored and displayed on the monitor 29. In this way, the electronic still camera of the first embodiment derives the compression level by performing preliminary compression by way of a field picture image, which has a small data amount. Then, compression of the frame picture image is performed with the derived compression level. Accordingly, since compression is never repeated with a frame picture image, which has a large data amount, the load on the hardware can be reduced, and the time until the frame picture image is compressed to the target data amount can be shortened.

More specifically, with the electronic still camera of the present embodiment, since a photographic picture image can be compressed and recorded in an extremely short period of time, it becomes possible to improve successive photography speed when performing successive photography.

In the first embodiment, the output of the CCD sensor 24 was the field picture image, however, in a second embodiment, the output of the CCD sensor 24 will be the frame picture image. Furthermore, the picture image compression process is performed according to a program that is stored in a recording medium (ROM card 45, see FIG. 10).

Figure 10:
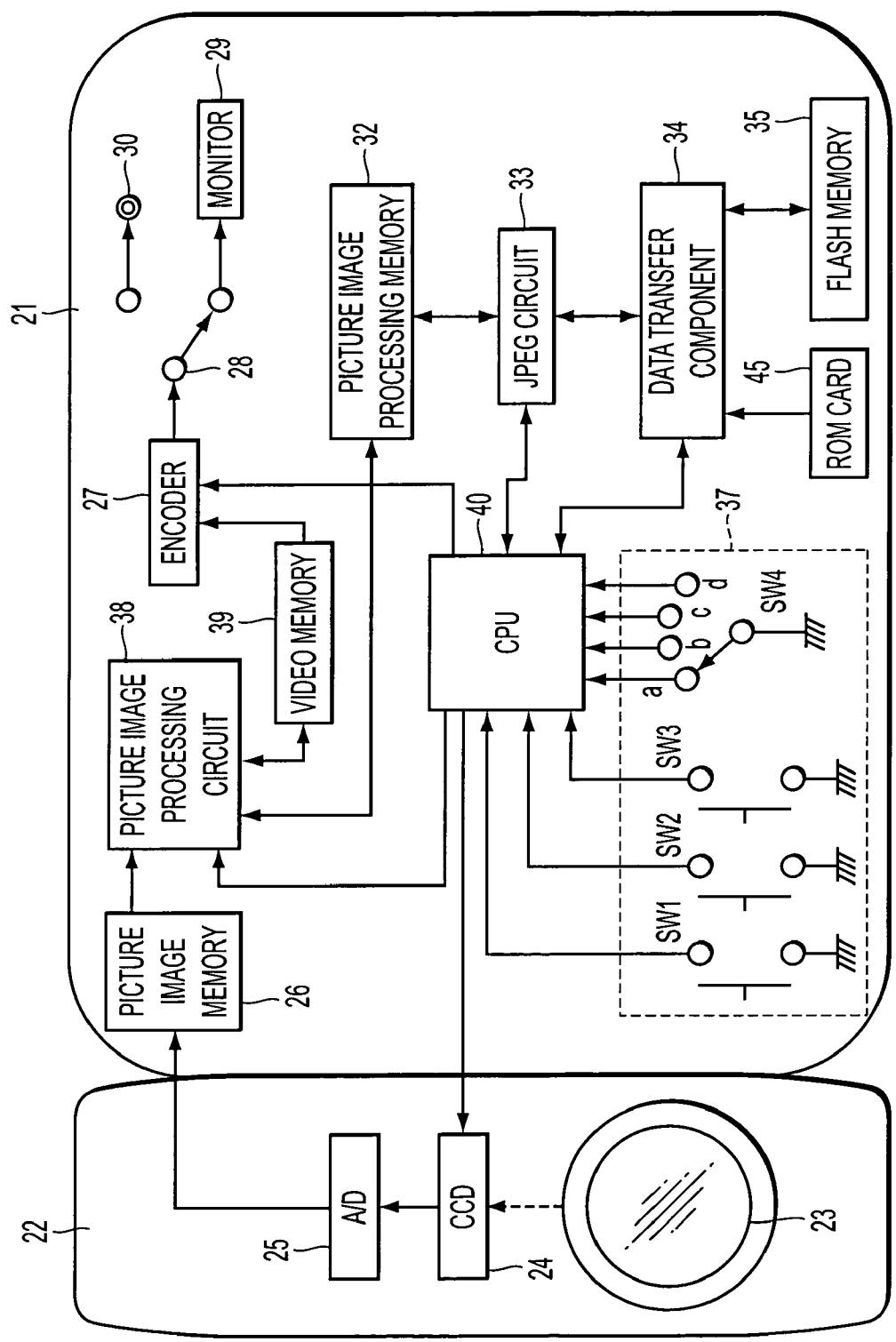
FIG. 10 is a block diagram of a camera according to a second embodiment of the invention.

FIG. 10 is a block diagram of the second embodiment. In FIG. 10, a main body 21 is attached to a camera component 22. Within the camera component 22 are a photographic lens 23 and a CCD sensor 24, which is arranged in a position to receive transmitted light of the photographic lens 23. The photo-electric signal of the CCD sensor 24 is input, through the A/D converter 25, into the picture image memory 26 arranged within the main body 21.

The output of the picture image memory 26 is input into the picture image processing circuit 38, and a first input/output terminal of the picture image processing circuit 38 is connected to the video memory 39. Further, the output of the video memory 39 is input into the video selection switch 28 through the encoder 27. The output of the video selection switch 28 is input into the monitor 29 or the video terminal 30.

The second input/output terminal of the picture image processing circuit 38 is connected to the flash memory 35 through the picture image processing memory 32, the JPEG circuit 33 and the data transfer component 34. Picture image data is transferred in both directions between the picture image processing circuit 38 and the flash memory 35.

Further, the CPU 40 is arranged within the main body 21, and the control output of the CPU 40 is input into the CCD sensor 24, the encoder 27, the JPEG circuit 33, the data transfer component 34 and the picture image processing circuit 38. In addition, the CPU 40 receives the output signals of the JPEG circuit 33, the data transfer component 34 and the operation switches 37.

Further, in the main body 21, the ROM card 45 is arranged so as to be able to be freely removed and attached. The output of the ROM card 45 is input into the data transfer component 34. In addition, a camera control program is stored in the ROM card 45.

The corresponding relationship between the high-level representation of the invention in FIG. 1 and the second embodiment is as follows. The picture image creation means 1 corresponds to the picture image processing circuit 38 and the video memory 39. The data amount determination means 2 corresponds to the CPU 40. The preliminary compression means 3 corresponds to the JPEG circuit 33. The compression means 4 also corresponds to the JPEG circuit 33. The picture image compression processing program is stored on ROM card 45.

A description of the operation of the second embodiment is now provided.

When the power switch (not shown in the figure) is switched ON, the CPU 40, through the data transfer component 34, reads the camera control program that is stored in the ROM card 45 and executes the following operations according to the program.

The CPU 40 initializes the system after clearing the picture image processing memory 32 and the video memory 39. The start photography command is input from the CPU 40 into the CCD sensor 24 and photography begins. The photographic object obtained through the photographic lens 23 is formed on the CCD sensor 24 and converted photo-electrically. The photo-electric signal is read in sequence and converted into a digital video signal by the A/D converter 25. In the picture image memory 26, the digital video signal is accumulated in the order received, thereby creating the frame picture image.

The picture image processing circuit 38 divides the frame picture image that is stored in the picture image memory 26 into an even number field picture image and an odd number field picture image by reading the picture element of every other scanning line. This is illustrated in FIG. 9.

The even number field picture image and the odd number field picture image that were divided by the picture image processing circuit 38 are accumulated and stored in sequence in the video memory 39.

The encoder 27 sequentially reads the even number field picture image and the odd number field picture image that are stored in the video memory 39, and then D/A converts them to an analog projected image signal, and outputs them to the video terminal 30 or the monitor 29 that is selected by the video selection switch 28. In this instance, the monitor 29 is selected.

Through the operation described above, when the power switch is switched ON, the picture image is taken-in regularly and sequentially displayed on the monitor 29. In this state, the CPU 40 determines whether the release switch SW1 of the operation switches 37 has been pressed. If the release switch SW1 is pressed, the following release routine is executed.

The CPU 40 outputs the stop output command of the analog projected image signal to the encoder 27. The encoder 27 stops, in accordance with such a command, reading the field picture image that is stored in the video memory 39, and temporarily stops the output of the analog projected image signal to the monitor 29. Next, at the moment that the release switch SW1 is pressed, the image formed on the CCD sensor 24 is accumulated and stored to the picture image memory 26 through the A/D converter 25. The picture image processing circuit 38 divides the frame picture image that is stored in the picture image memory 26 into an even number field picture image and an odd number field picture image by reading the picture element of every other scanning line, and the two picture image fields are transferred to the video memory 39.

The CPU 40 outputs the restart output command of the analog projected image signal to the encoder 27, and the encoder 27 reads the even number field picture image and the odd number field picture image that are stored in the video memory 39, and D/A converts each of these to an analog projected image signal, and then outputs it to the monitor 29.

According to the operation described above, the operator has the ability to take in a picture image at the moment there is a photographic opportunity by pressing the release switch SW1.

A description of the operation that records the taken picture image into the flash memory 35 is now described. The CPU 40 determines whether the recording switch SW2 of the operation switches 37 is pressed, and when the recording switch SW2 is pressed, the following recording routine is executed.

Picture image processing circuit 38, according to the field picture image creation command from the CPU 40, divides the frame picture image that is stored in the picture image memory 26 into an even number field picture image and an odd number field picture image and stores them in the video memory 39. Picture image processing circuit 38, according to the field picture image reading command from the CPU 40, selects one of the two fields from the video memory 39, and transfers it to the picture image processing memory 32. The CPU 40, for example, is set in advance so as to compress a several MB frame picture image to a target data amount of about 100 KB. In addition, since the field picture image is the data amount of ½ of the frame picture image, the CPU 40 is set in advance so as to compress the field picture image to a preliminary compression target data amount of 50 KB.

Although the preliminary compression target data amount is set in advance in the CPU 40 as an alternative, the CPU 40 may also be set up to read the data amount of the field picture image and the frame picture image and compute directly by way of the expression (preliminary compression target data amount)=(target data amount)×(data amount of the field picture image)/(data amount of the frame picture image).

The JPEG circuit 33 repeats the compression process until the field picture image that is stored in the picture image processing memory 32 becomes the preliminary compression target data amount. Furthermore, since the specifics of the preliminary compression that takes place in the picture image processing memory 32 and the JPEG circuit 33 has already been described above in the first embodiment, further explanation will be omitted here. The preliminary compression is performed of the field picture image, and when the compression level is determined, the picture image processing circuit 38 transfers the frame picture image stored in the picture image memory 26 to the picture image processing memory 32 by following the frame picture image reading command from the CPU 40.

The JPEG circuit 33, according to the start ma-n compression command from the CPU 40, performs compression by reading the frame picture image from the picture image processing memory 32. At this time, the JPEG circuit 33 compresses the frame picture image in accordance with the compression level derived by the preliminary compression. The frame picture image that is compressed to the target data amount is read and recorded to the flash memory 35 through the data transfer component 34 as a compressed picture image file.

According to the operation described above, a taken picture image can be recorded to the flash memory 35.

A description of the operation for reading and reproducing a picture image that has been recorded in the flash memory 35 is now provided. The CPU 40 determines whether the read switch SW3 of the operation switches 37 is pressed, and when the read switch SW3 is pressed, the read routine to be described hereafter is executed.

A compressed picture image file is read from the flash memory 35, and is expanded to the frame picture image by the JPEG circuit 33. Since the specifics of the operation to store into the picture image processing memory 32 have already been described in the first embodiment, further explanation will be omitted here.

The CPU 40 outputs the stop output command of the analog projected image signal to the encoder 27. The encoder 27, according to such command, stops the reading of the field picture image that is stored in the video memory 39. The picture image processing circuit 38 divides the frame picture image that is stored in the picture image processing memory 32 into an even number field picture image and an odd number field picture image, thereby creating two picture image fields that are transferred to the video memory 39.

The encoder 27, by means of the restart output command of the analog projected image signal from the CPU 40, reads the even number field picture image and the odd number field picture image that are stored in the video memory 39, and D/A converts them to a sequential analog projected image signal where it is output to the monitor 29.

According to the process described above, the compressed picture image is restored and displayed on the monitor 29. The second embodiment has the same result as the first embodiment.

Figure 11:
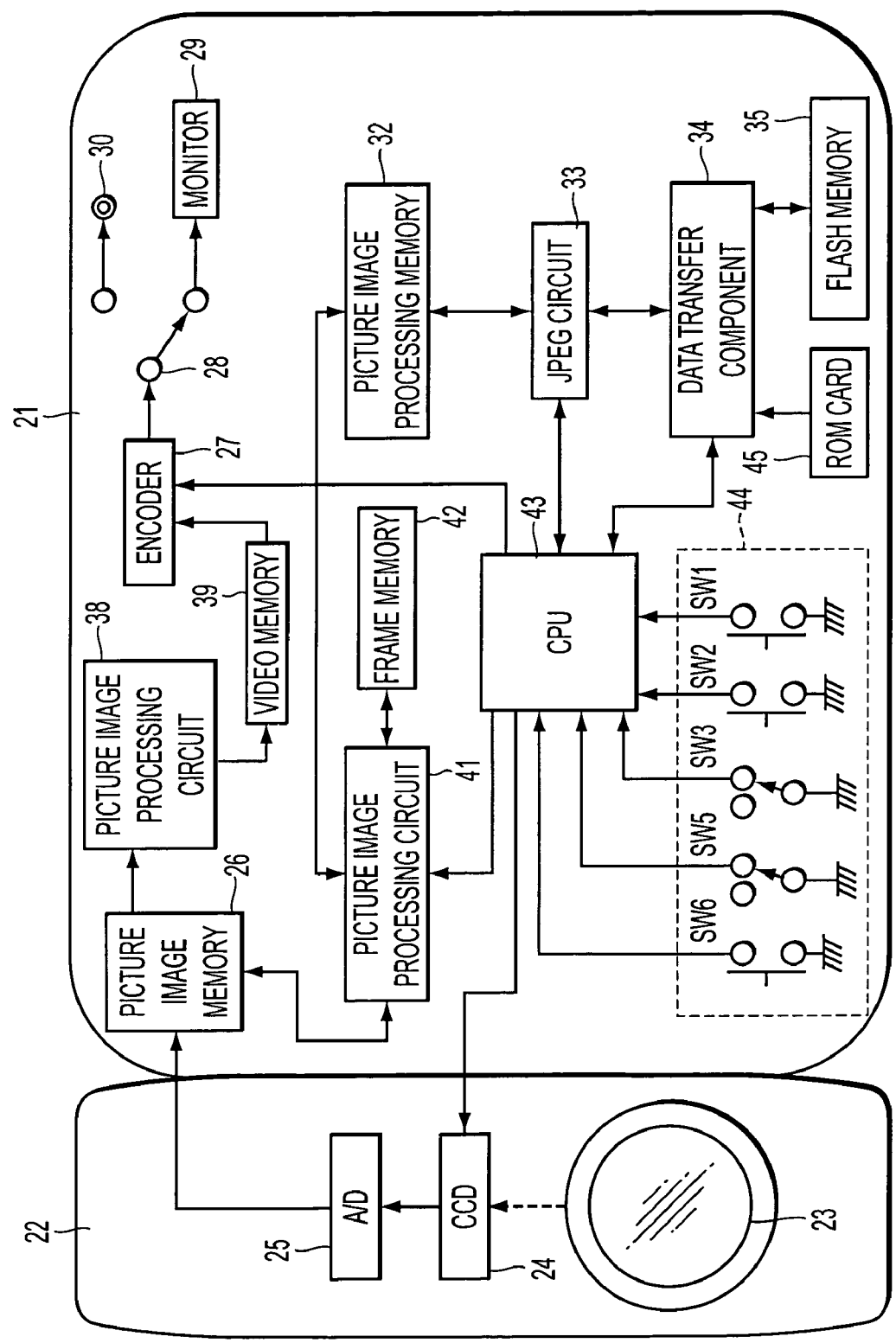
FIG. 11 is a block diagram of a camera according to a third embodiment of the invention.

In a third embodiment, preliminary compression will be performed by using a thumbnail picture image, rather than a field picture image. FIG. 11 is a block diagram of the third embodiment.

In FIG. 11, a main body 21 is attached to a camera component 22. Within the camera component 22 are a photographic lens 23 and a CCD sensor 24, which is arranged in a position to receive transmitted light of the photographic lens 23. The photo-electric signal of the CCD sensor 24 is input, through the A/D converter 25, into the picture image memory 26, which is arranged within the main body 21.

The output of the picture image memory 26 is input into the picture image processing circuit 38. The output terminal of the picture image processing circuit 38 is connected to the input terminal of the video memory 39. Further, the output of the video memory 39 is input into the video selection switch 28 through the encoder 27. The output of the video selection switch 28 is input into the monitor 29 or the video terminal 30.

The input/output terminal of the picture image memory 26 is connected to the input/output terminal of the picture image processing circuit 41, which is arranged within the main body 21. The picture image processing circuit 41 transfers picture image data in both directions between the picture image processing memory 32 and the frame memory 42. The picture image processing memory 32 is connected to the flash memory 35 through the JPEG circuit 33 and the data transfer component 34. Picture image data is transferred in both directions between the picture image processing memory 32 and the flash memory 35.

Further, the CPU 43 is arranged within the main body 21. The control output of the CPU 43 is input into the CCD sensor 24, the encoder 27, the JPEG circuit 33, the data transfer component 34 and the picture image processing circuit 41. The output signals of the JPEG circuit 33, the data transfer component 34 and the operation switches 44 are input into the CPU 43.

Further, in the main body 21, the ROM card 45 is arranged so as to be able to be freely removed and attached. The output of the ROM card 45 is input into the data transfer component 34. In addition, in this ROM card 45 is stored the camera control program.

The corresponding relationship between the high-level representation of the invention in FIG. 1 and the third embodiment is as follows. The picture image creation means 1 corresponds to the picture image processing circuit 41 and the frame memory 42. The data amount determination means 2 corresponds to the CPU 43. The preliminary compression means 3 corresponds to the JPEG circuit 33. The compression means 4 also corresponds to the JPEG circuit 33.

FIG. 12 through FIG. 16 are flow charts describing the operation of the third embodiment. A description of the operation of the third embodiment is provided hereafter with reference to the figures.

When the power switch (not shown in the figure) is switched ON, the CPU 43, through the data transfer component 34, reads the camera control program stored in the ROM card 45 and executes the following operation according to such program.

Figure 12:
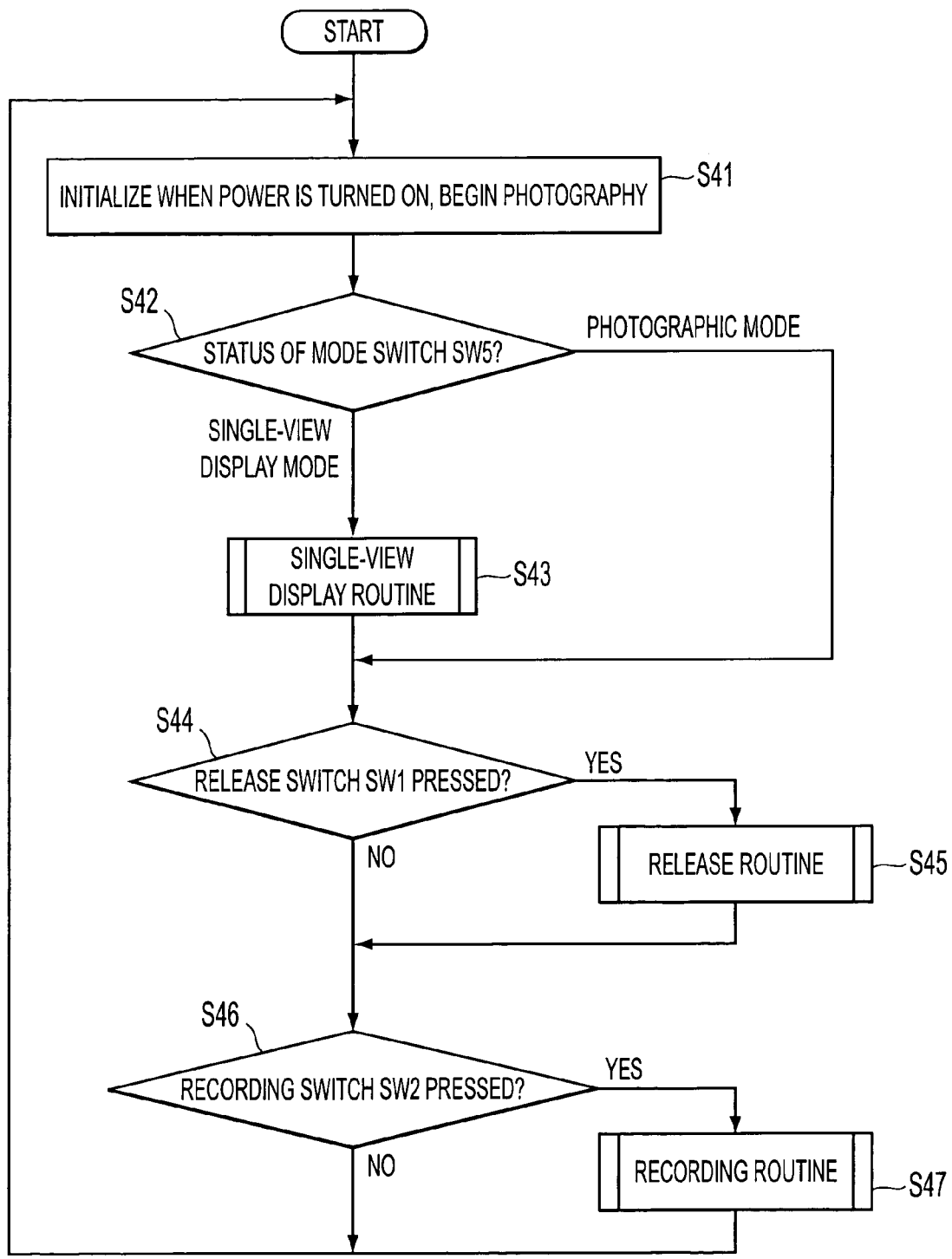
FIG. 12 is a flow chart of a main routine performed by the camera of the third embodiment.

After clearing the picture image memory 26, the picture image processing memory 32, the video memory 39, and the frame memory 42, the CPU 43 initializes the system (step S41 in FIG. 12).

The switch SW5 of the operation switches 44 is a mode switch that switches between the photographic mode and the single-view display mode. The CPU 43 determines which of these modes is currently selected (step S42 of FIG. 12).

When in the photographic mode, the start photography command is input from the CPU 43 into the CCD sensor 24 and photography begins. Moreover, the picture image is taken regularly, and since the description of the operation for sequential display on the monitor 29 was already given in the first and second embodiments, further description will be omitted here.

The CPU 43 determines whether the release switch SW1 of the operation switches 44 has been pressed. If the release switch SW1 is pressed (step S44 of FIG. 12), the following release routine is executed (step S45 of FIG. 12).

The CPU 43 outputs the stop output command of the analog projected image signal to the encoder 27. The encoder 27 stops, according to such command, reading the field picture image that is stored in the video memory 39, and temporarily stops the output of the analog projected image signal to the monitor 29 (step S51 of FIG. 13). Next, at the moment that the release switch SW1 is pressed, the image formed on the CCD sensor 24 is accumulated and stored to the picture image memory 26 through the A/D converter 25 (step S52 of FIG. 13).

The picture image processing circuit 38 divides the frame picture image that is stored in the picture image memory 26 into an even number field picture image and an odd number field picture image by reading the picture element of every other scanning line. The two picture image fields are transferred to the video memory 39 (step S53 of FIG. 13).

Figure 13:
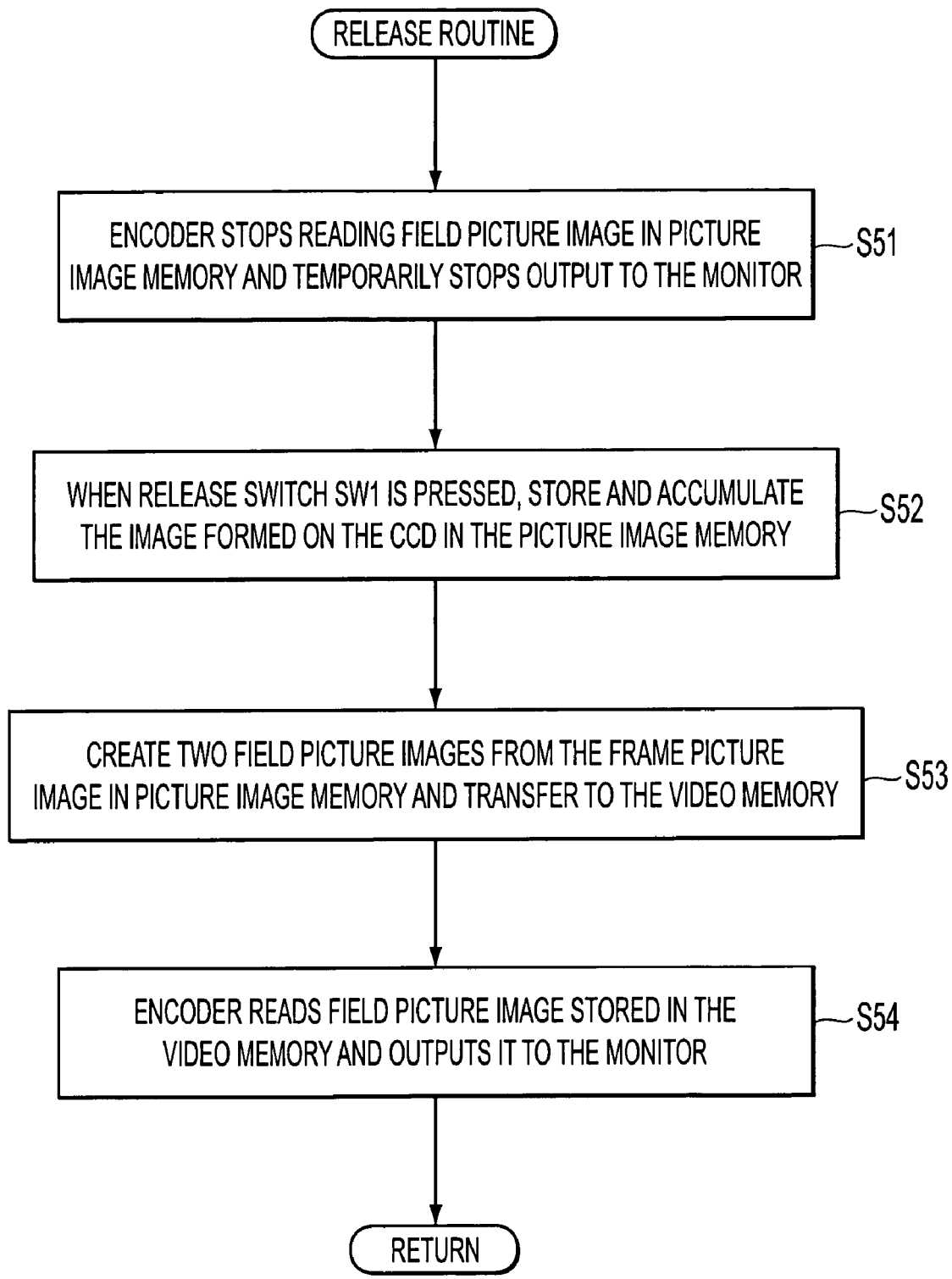
FIG. 13 is a flow chart of a release routine performed by the camera of the third embodiment.

The CPU 43 outputs the restart output command of the analog projected image signal to the encoder 27, and the encoder 27 reads the even number field picture image and the odd number field that are stored in the video memory 39, and D/A converts each of these to the analog projected image signal, and then outputs it to the monitor 29 (step S54 of FIG. 13).

According to the operation described above, the operator has the ability to take in a picture image at the moment there is a photographic opportunity by pressing the release switch SW1.

Next, a description of the operation that records the taken picture image into the flash memory 35 will be described. The CPU 43 determines whether the recording switch SW2 of the operation switches 44 is pressed. When the recording switch SW2 is pressed (step S46 of FIG. 12), the following recording routine is executed (step S47 of FIG. 12).

Figure 17:
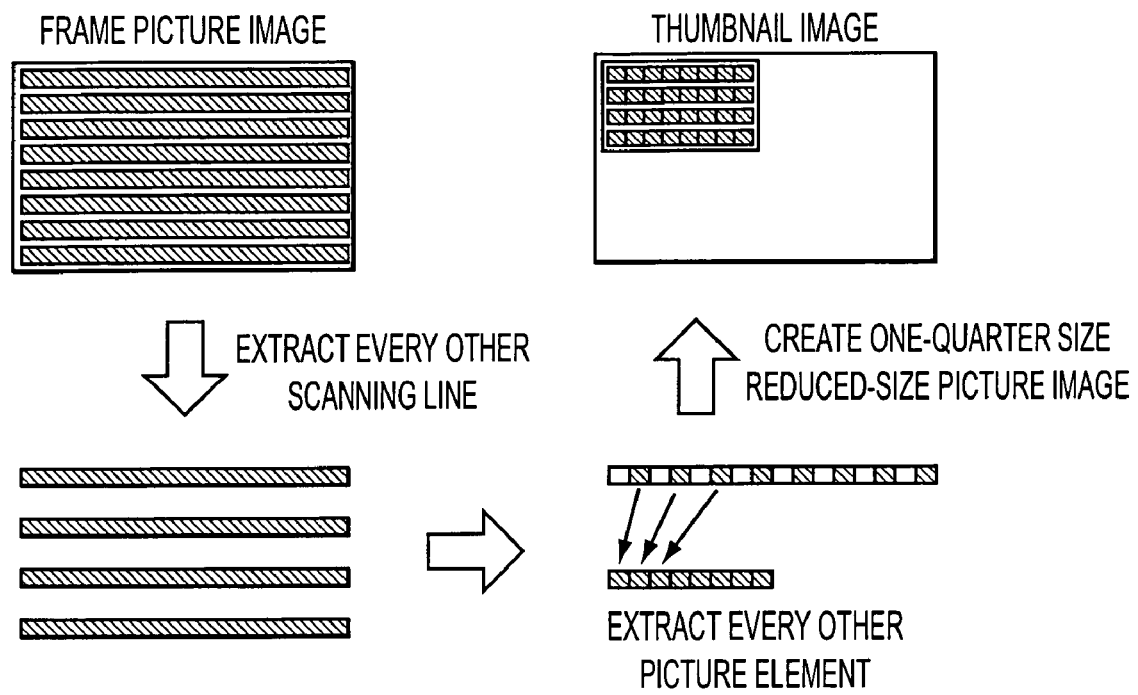
FIG. 17 illustrates thumbnail picture image creation.

The picture image processing circuit 41, according to the thumbnail picture image creation command from the CPU 43, reads the frame picture image that is stored in the picture image memory 26, and, as shown in FIG. 17, creates the ¼ reduced-size picture image. This reduced-size picture image is a thumbnail picture image for single-view display use. It is not limited to a ¼ reduction. First, the picture image data is extracted from the frame picture image by every other scanning line. Next, every other picture element from each line of picture image data that was extracted is thinned, thereby creating a ¼ reduced-size picture image. The thumbnail picture image created from the picture image processing circuit 41 is mapped to a prescribed address in the frame memory 42 (step S61 of FIG. 14).

Figure 14:
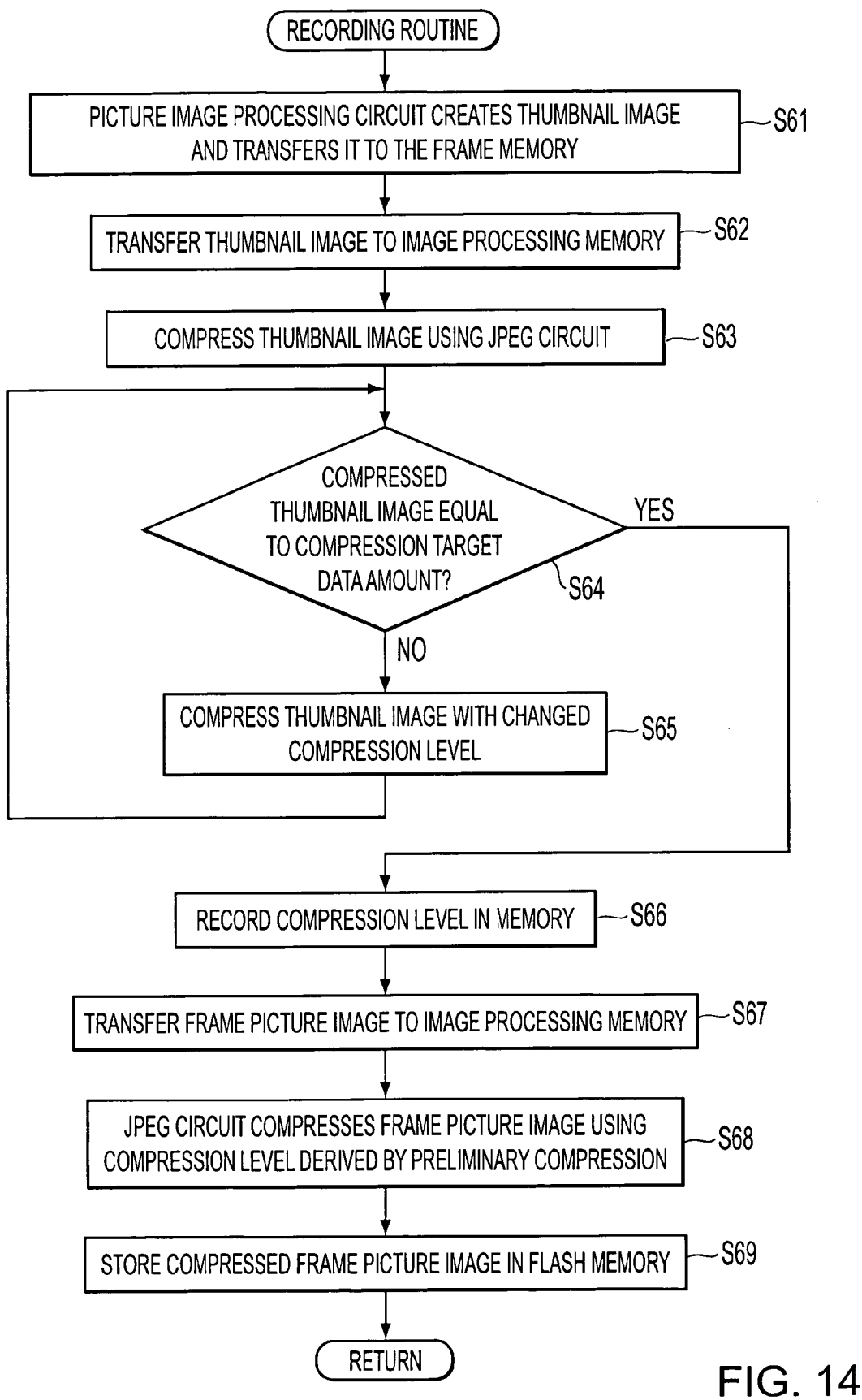
FIG. 14 is a flow chart of a recording routine performed by the camera of the third embodiment.

Next, the picture image processing circuit 41 reads the thumbnail picture image that is stored in the frame memory 42 and transfers that to the picture image processing memory 32 (step S62 of FIG. 14).

The CPU 43, for example, is set in advance so as to compress a several MB frame picture image to a target data amount of about 100 KB. In addition, since the thumbnail picture image is the data amount of ¼ of the frame picture image, the CPU 43 is set in advance so as to compress the thumbnail picture image to a preliminary compression target data amount of 25 KB. Although the preliminary compression target data amount is set in advance in the CPU 43, as an alternative, the CPU 43 may also be set up to read the data amount of the thumbnail picture image and the frame picture image and compute directly by means of the expression (preliminary compression target data amount)=(target data amount)×(data amount of the thumbnail picture image)/(data amount of the frame picture image).

The JPEG circuit 33 repeats the compression process until the thumbnail picture image stored in the picture image processing memory 32 is compressed to the preliminary compression target data amount. In this instance, a description of the specific numerical value will be given relative to the preliminary compress process. For example, the data amount of the thumbnail picture image becomes 250 KB (with a frame picture image of 1 MB).

The preliminary compression target data amount and the preliminary compression initiation command are transferred from the CPU 43 to the JPEG circuit 33. The JPEG circuit 33, according to such command, reads the thumbnail picture image that is stored in the picture image processing memory 32 and begins the compression. The JPEG circuit 33 reads the data amount of the thumbnail picture image that is stored in the picture image processing memory 32 and compresses such data amount so that it matches the preliminary compression target data amount. In this instance, since a 250 KB data amount must be compressed so as to become 25 KB, first, compression is performed at a compression level of 30 (expected compression ratio 10%).

The picture image compression is performed by performing the following steps in the following order: DCT, followed by linear quantization, followed by variable length coding (step S63 in FIG. 14). JPEG circuit 33 repeats the compression by changing the compression level until the compression result is within a range of 25 KB± an allowable value, thereby deriving the compression level when arriving within this range (steps S64 and S65 of FIG. 14).

For example, when the compression result is 20 KB, since the compression level is too large and there is the possibility that the picture image will deteriorate upon reproduction, the compression level is lowered. According to expression (1) described above, an expected compression ratio for the next time is computed to be 12.5%. The JPEG circuit 33 performs compression again at the compression level that corresponds to this expected compression ratio, and it then determines whether the compression result has become 25 KB.

In addition, when the compression result is 30 KB, since the compression level is too small, an expected compression ratio of 8.3% is computed by the aforementioned expression (1). Then, the compression is performed again at the compression level that corresponds to this expected compression ratio, and it is determined whether the compression result has become 25 KB.

The change of the compression level is executed by appropriately adopting, from a quantization table having different quantization amounts stored in the internal memory of the JPEG circuit 33, a quantization amount for the desired compression level.

The JPEG circuit 33 repeats the feed back process described above, and the compression level that compresses the thumbnail picture image to the preliminary compression target data amount is derived. The CPU 43 stores that compression level in the internal memory (step S66 of FIG. 14).

Next, the picture image processing circuit 41, by means of the frame picture image reading command from the CPU 43, transfers the frame picture image that is stored and accumulated in the picture image memory 26 to the picture image processing memory 32 (step S67 of FIG. 14). The JPEG circuit 33, according to the start main compression command from the CPU 43, performs compression by reading the frame picture image from the picture image processing memory 32. At this time, the JPEG circuit 33, according to the compression level derived by the preliminary compression, compresses the frame picture image (step S68 of FIG. 14). Since the extent of the spatial redundancy of the frame picture image and the thumbnail picture image are nearly identical, the compression level of the thumbnail picture image can comply with the frame picture image. Accordingly, when compression occurs at this compression level, the frame picture image is compressed to the target data amount.

The frame picture image that is compressed to the target data amount is read and recorded to the flash memory 35 through the data transfer component 34 as a compressed picture image file (step S69 of FIG. 14). At this time, in the header area of the compressed picture image file, together with the identification name of the file, the compression level at the time of compression as well as the identification name of the corresponding thumbnail picture image are recorded.

According to the operation described above, a taken picture image can be recorded to the flash memory 35.

Next, a description of the operation for reading and reproducing for display a picture image that has been recorded in the flash memory 35 will be provided hereafter. The CPU 43 determines the mode status of the mode switch SW5. When switching to the single-view display mode, the single-view display routine to be described hereafter is executed (step S43 of FIG. 12).

Figure 15:
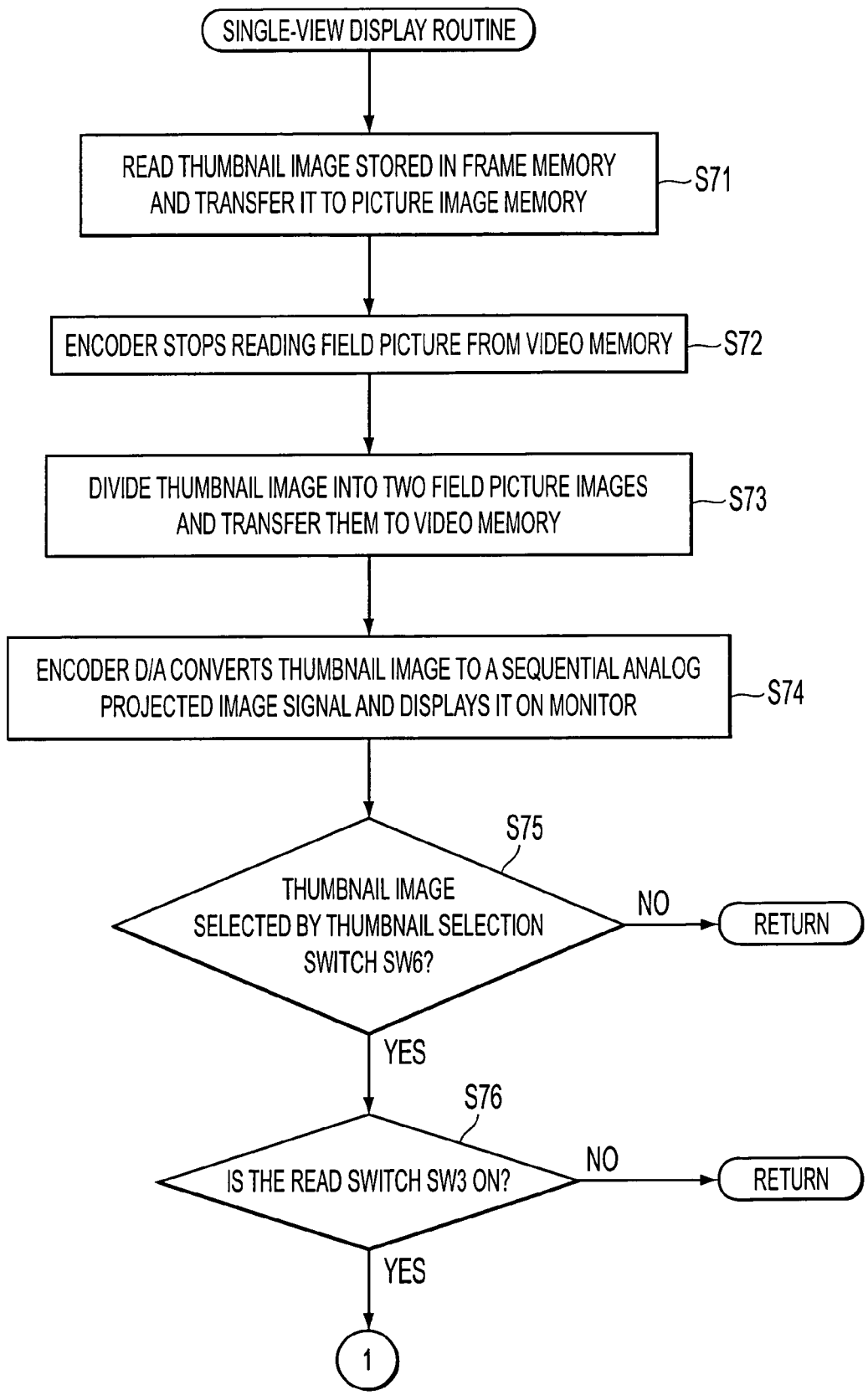
FIG. 15 is a first part of a flow chart of a single-view display routine.

The picture image processing circuit 41, according to the thumbnail picture image reading command from the CPU 43, reads the thumbnail picture image that is stored in the frame memory 42, and transfers it to the picture image memory 26 (step S71 of FIG. 15). The encoder 27, according to the stop output command of the analog projected image signal from the CPU 43, stops the reading of the field picture image from the video memory 39 (step S72 of FIG. 15)

The picture image processing circuit 38, divides the thumbnail picture image that is stored in the picture image memory 26 into the even number field picture image and the odd number field picture image by reading the picture element of every other scanning line, and these two picture image fields are transferred sequentially to the video memory 39 (step S73 of FIG. 15). The encoder 27, according to the restart output command of the analog projected image signal from the CPU 43, D/A converts the even number field picture image and the odd number field picture image of the thumbnail picture image that is stored in the video memory 39, and displays it on the monitor 29 that is selected by the video selection switch 28 (step S74 of FIG. 15). The thumbnail picture image is displayed on the monitor 29 by means of the operation described above.

Figure 18:
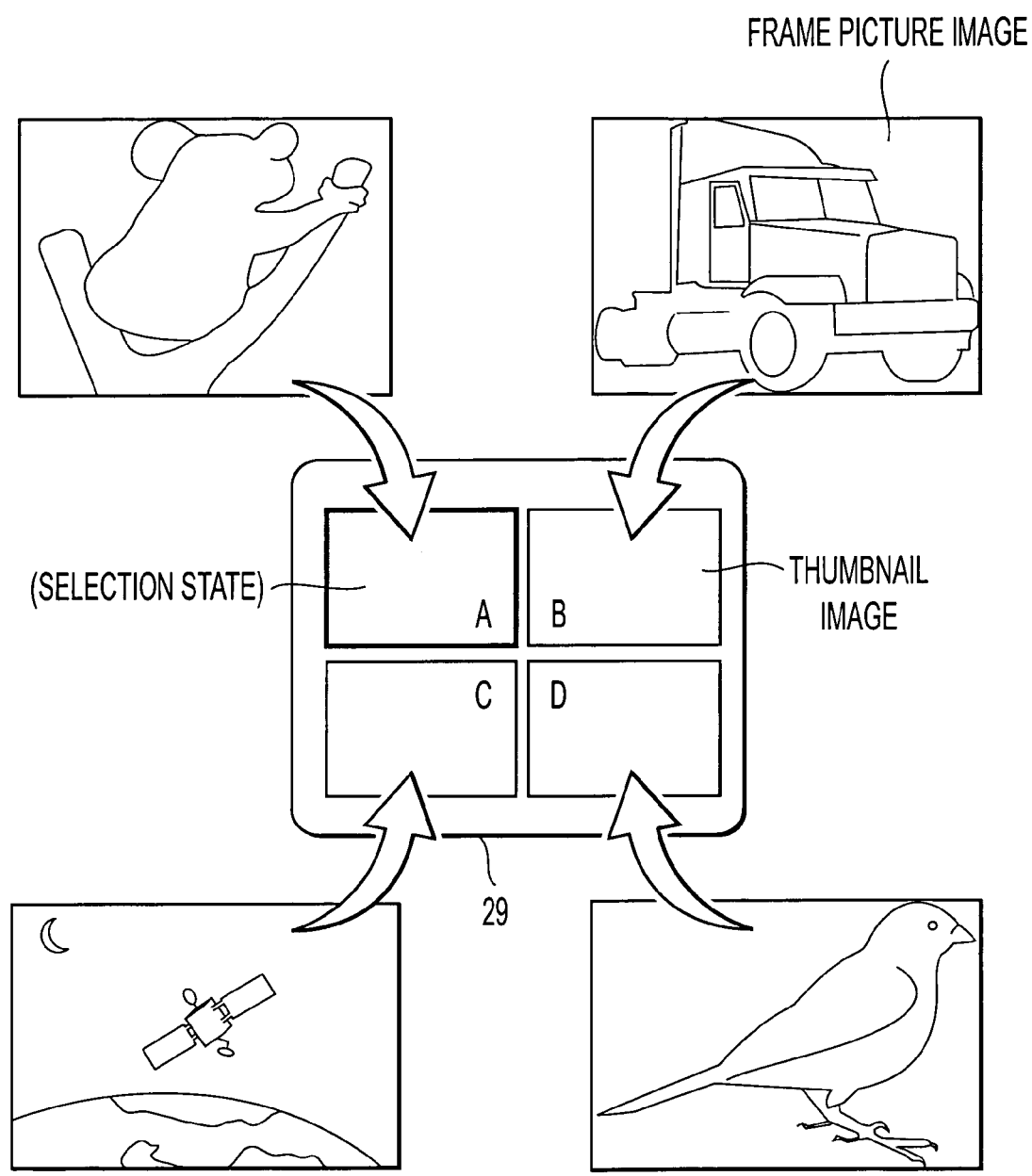
FIG. 18 illustrates the thumbnail picture image selection process and a plurality of thumbnail picture images displayed on a display screen.

In addition, when the thumbnail selection switch SW6 is pressed in this state, the CPU 43, according to the pressing operation, selects the thumbnail picture image (step S75 of FIG. 15). For example, when there are 4 thumbnail picture images as shown in FIG. 18, the CPU 43 upon each pressing of the SW6, selects the thumbnail picture image in the sequence of A, then B, then C, then D, and changes exterior frame display of the thumbnail picture image that is selected. In this way, following the directions of the CPU 43, the picture image processing circuit 41 creates the thumbnail picture image by adjusting the exterior frame of the thumbnail picture image that is selected.

Figure 16:
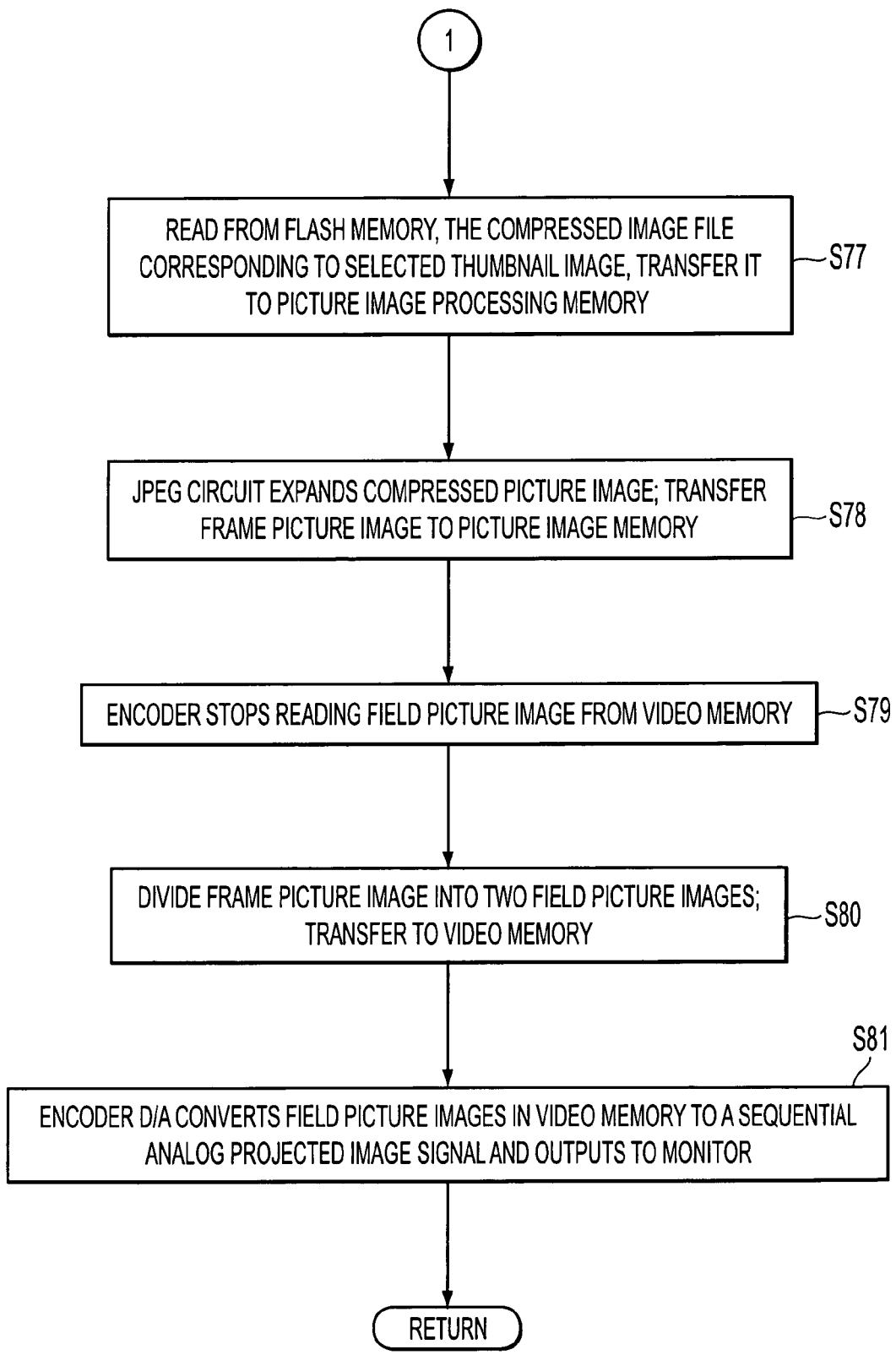
FIG. 16 is a second part of a flow chart of the single-view display routine.

When turning on the read switch SW3 when the thumbnail picture image is in the selected status (step S76 of FIG. 15), the CPU 43, based on the identification name of the selected thumbnail picture image, reads the corresponding compressed picture image file through the data transfer component 34 where it is transferred to the picture image processing memory 32 (step S77 of FIG. 16). At this time, the CPU 43 reads the compression level at the time of compression from the header area of the compressed picture image file.

The start expansion command and the compression level information of the compressed picture image file are transferred from the CPU 43 to the JPEG circuit 33. The JPEG circuit 33 performs the expansion process of the compressed picture image as described previously. At this time, the JPEG circuit 33, for reverse quantization, executes the expansion process that corresponds to the compression level used by the quantization table that was used at the time of compression.

The frame picture image that is expanded is stored and accumulated in the picture image processing memory 32. The picture image processing circuit 41 transfers such frame picture image to the picture image memory 26 (step S78 of FIG. 16).

The CPU 43 outputs the stop output command of the analog projected image signal to the encoder 27. The encoder 27 stops the reading of the field picture image from the video memory 39 (step S79 of FIG. 16). The picture image processing circuit 38 divides the frame picture image of the picture image memory 26 into two fields of picture images, and then transfers them to the video memory 39 (step S80 of FIG. 16). The encoder 27, in accordance with the restart output command of the analog projected image signal from the CPU 43, D/A converts the even number field picture image and the odd number field picture image that are stored in the video memory 39 to a sequential analog projected image signal where it is then output to the monitor 29 (step S81 of FIG. 16).

In accordance with the process described above, the operator can, by selecting the desired picture image from within a group of single-view display thumbnail picture images, reproduce and display such picture image onto the monitor 29.

In this way, in the third embodiment, the compression level is derived by performing preliminary compression on a thumbnail picture image for single-view display, and compressing the frame picture image according to such compression level. Accordingly, the compression process for a frame picture image with a large data amount is completed in one attempt, thereby making possible the compression of a frame picture image to a target data amount in a short period of time.

Moreover, in the present invention, an explanation using an electronic still camera as the example which employs the picture image compression apparatus of the present invention. However, the photographic component is not a necessary component of the device. In other words, the present invention may also compress picture image data created externally. For example, the compression process may also be applied to a picture image data read into an image scanner, transferred from an external source, or so forth.

Furthermore, in the present embodiment, a flash memory was used as the medium to record the compressed picture image. However, without being limited to that, the invention may also use a magnetic recording medium, an optical recording medium, and a magnetooptical recording medium, for example. In addition, the picture image compression processing program and the compressed picture image are recorded in individual recording mediums. They may also be recorded into the same recording medium.

Further, in the present embodiment, in the case where the extent of spatial redundancy of the frame picture image and the reduced-size picture image is different, there will be cases when the compression result of the frame picture image does not match to the target data amount. At this time, the frame picture image may be compressed directly so as to match the target data amount. Furthermore, the preliminary compression target data amount may also be adjusted to correspond to either target data amount or the compression result of the frame picture image, thereby making a match with the target data amount by performing again preliminary compression followed by compression of the frame picture image.

Furthermore, any one portion of the frame picture image may also be cut-out as the method of creating the reduced-size picture image.

In addition, in the third embodiment, the thumbnail picture image itself may also be compressed by the JPEG circuit 33 and recorded into the flash memory 35. By so doing, the frame memory 42 for the recording of the thumbnail picture image can be an inexpensive memory such as a DRAM.

In addition, while the description in the present embodiment used the JPEG, MPEG may also be used as the compression method. Various other compression techniques, such as, for example, wavelet and fractal compression, can be used with the invention. Rather than Huffman coding, the variable length coding can be, for example, run-length coding, LZW, and/or minimum redundancy coding.

Although the described embodiments used a CCD as the image pickup, other photosensors could be used. For example, a CMOS device or a PSD (Photo-Sensitive-Diode) also can be used as the image pickup.

In the illustrated embodiment, the camera controller (the CPU and associated circuitry) is implemented using a suitably programmed general purpose computer, e.g., a microprocessor, microcontroller or other processor device (CPU or MPU). It will be appreciated by those skilled in the art, that the controller can also be implemented as a single special purpose integrated circuit (e.g., ASIC) having a main or central processor section for overall, system-level control, and separate sections dedicated to performing various different specific computations, functions and other processes under control of the central processor section. The controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer in conjunction with one or more peripheral (e.g., integrated circuit) data and signal processing devices. In general, any device or assembly of devices on which a finite state machine capable of implementing the flow charts shown in FIGS. 4–7 and/or 12–16 can be used as the controller.

As noted earlier, the invention further includes, as another aspect, a carrier wave encoded with the control program (described above) that is readable by the controller (a computer) to control the camera to function as described above. The carrier wave can be transmitted over a communications network such as, for example, the World Wide Web, and/or transmitted in a wireless fashion, for example, by radio waves or by infrared waves. Additionally, or alternatively, the carrier wave can be fixed in a computer-readable recording medium, such as, for example, a CD-ROM, a computer hard drive, RAM, or other types of memories that are readily removable or intended to remain fixed within the computer. One such memory is the ROM card 45.

Additionally, and as noted earlier, the invention can be implemented in apparatus other than a camera. That is, the device that performs the image processing need not be capable of creating an electronic picture image. The electronic picture image simply can be input to the image processing apparatus.

While the present invention has been described with reference to preferred embodiments thereof, it is to be Understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A picture image compression apparatus that compresses data of a picture image to a predetermined target data amount, comprising:

picture image creation means for creating, from the picture image, a reduced-size picture image having a reduced number of picture elements of the picture image;

preliminary compression means for compressing the reduced-size picture image to a preliminary compression target data amount related to the predetermined target data amount by transforming the reduced-size picture image, quantizing the transformed reduced-size picture image, and coding the quantized reduced-size picture image; and compression means for compressing the picture image to the predetermined target data amount by transforming the picture image, quantizing the transformed picture image, and coding the quantized picture image;

wherein the preliminary compression means derives a compression level of the picture image, based on a compression ratio when the reduced-size picture image is compressed to the preliminary compression target data amount; and wherein the compression means compresses the picture image to the predetermined target data amount, based on the compression level derived by the preliminary compression means.

2. The picture image compression apparatus of claim 1, wherein the picture image creation means creates a field picture image as the reduced-size picture image.

3. The picture image compression apparatus of claim 1, wherein the picture image creation means creates a thumbnail picture image as the reduced-size picture image.

4. The picture image compression apparatus of claim 3, wherein a plurality of the thumbnail picture images are capable of being displayed in a single-view display.

5. The picture image compression apparatus of claim 1, wherein the preliminary compression means derives the compression level by repeatedly compressing the reduced-size picture image using different compression levels until a compression level is used that results in the preliminary compression target data amount being obtained.

6. The picture image compression apparatus of claim 1, wherein the preliminary compression means and the compression means perform compression by omitting redundant data from the picture image and the reduced-size picture image.

7. The picture image compression apparatus of claim 1, further comprising data amount determination means for deriving the preliminary compression target data amount from the predetermined target data amount.

8. The picture image compression apparatus of claim 7, wherein the data amount determination means also derives the preliminary compression target data amount from a ratio between data amounts of the picture image and the reduced-size picture image.

9. The picture image compression apparatus of claim 1, wherein the picture image compression apparatus is an electronic camera having picture image input means for photoelectrically converting an object image into the data of the picture image.

10. The picture image compression apparatus of claim 1, wherein the preliminary compression target data amount is less than the predetermined target data amount.

11. A picture image compression apparatus that compresses data of a picture image to a predetermined target data amount, comprising:

a picture image processor that creates, from the picture image, a reduced-size picture image having a reduced number of picture elements of the picture image;

a compression circuit that compresses the reduced-size picture image to a preliminary compression target data amount related to the predetermined target data amount by transforming the reduced-size picture image, quantizing the transformed reduced-size picture image, and coding the quantized reduced-size picture image; and a controller that compresses the picture image to the predetermined target data amount by transforming the picture image, quantizing the transformed picture image, and coding the quantized picture image;

wherein the compression circuit derives a compression level of the picture image, based on a compression ratio when the reduced-size picture image is compressed to the preliminary compression target data amount; and wherein the controller compresses the picture image to the predetermined target data amount, based on the compression level derived by the compression circuit.

12. The picture image compression apparatus of claim 11, wherein the picture image processor creates a field picture image as the reduced-size picture image.

13. The picture image compression apparatus of claim 11, wherein the picture image processor creates a thumbnail picture image as the reduced-size picture image.

14. The picture image compression apparatus of claim 11, wherein the compression circuit performs compression by omitting redundant data from the picture image that is to be compressed.

15. The picture image compression apparatus of claim 14, wherein the compression circuit is a JPEG compression circuit.

16. The picture image compression apparatus of claim 11, wherein the picture image compression apparatus is an electronic camera having a photoelectric converter that converts an object image into the data of the picture image.

17. The picture image compression apparatus of claim 11, wherein the preliminary compression target data amount is less than the predetermined target data amount.

18. A method of determining a compression level to be used to compress data of a picture image to a predetermined target data amount, comprising the steps of:
    creating, from the picture image, a reduced-size picture image having a reduced number of picture elements of the picture image;
    compressing the reduced-size picture image to a preliminary compression target data amount related to the predetermined target data amount by transforming the reduced-size picture image, quantizing the transformed reduced-size picture image, and coding the quantized reduced-size picture image; and
    compressing the picture image to the predetermined target data amount by transforming the picture image, quantizing the transformed picture image, and coding the quantized picture image;
    wherein compressing the reduced-size picture image comprises deriving a compression level of the picture image, based on a compression ratio when the reduced-size picture image is compressed to the preliminary compression target data amount; and
    wherein compressing the picture image comprises compressing the picture image to the predetermined target data amount, based on the derived compression level.

19. The method of claim 18, further comprising the step of compressing the data of the picture image to the predetermined target data amount using the derived compression level.

20. The method of claim 18, wherein the reduced-size picture image is a field picture image.

21. The method of claim 18, wherein the reduced-size picture image is a thumbnail picture image.

22. The method of claim 18, wherein the step of deriving the compression level includes repeatedly compressing the reduced-size picture image using different compression levels until a compression level is used that results in the preliminary compression target data amount being obtained.

23. The method of claim 18, further comprising deriving the preliminary compression target data amount from the predetermined target data amount.

24. The method of claim 23, wherein the preliminary compression target data amount also is derived from a ratio between data amounts of the picture image and the reduced-size picture image.

25. The method of claim 18, wherein the preliminary compression target data amount is less than the predetermined target data amount.

26. A computer-readable recording medium encoded with a computer executable control program for determining a compression level to be used to compress data of a picture image to a predetermined target data amount, the control program including instructions for:
    creating, from the picture image, a reduced-size picture image having a reduced number of picture elements of the picture image;
    compressing the reduced-size picture image to a preliminary compression target data amount related to the predetermined target data amount by transforming the reduced-size picture image, quantizing the transformed reduced-size picture image, and coding the quantized reduced-size picture image; and
    compressing the picture image to the predetermined target data amount by transforming the picture image, quantizing the transformed picture image, and coding the quantized picture image;
    wherein compressing the reduced-size picture image comprises deriving a compression level of the picture image, based on a compression ratio when the reduced-size picture image is compressed to the preliminary compression target data amount; and
    wherein compressing the picture image comprises compressing the picture image to the predetermined target data amount, based on the derived compression level.

27. The computer-readable recording medium of claim 26, wherein the control program further includes instructions for compressing the data of the picture image to the predetermined target data amount using the derived compression level.

28. The computer-readable recording medium of claim 26, wherein the creating instruction is to create the reduced-size picture image by creating a field picture image.

29. The computer-readable recording medium of claim 26, wherein the creating instruction is to create the reduced-size picture image by creating a thumbnail picture image.

30. The computer-readable recording medium of claim 26, wherein the instruction to derive the compression level includes an instruction to repeatedly compress the reduced-size picture image using different compression levels until a compression level is used that results in the preliminary compression target data amount being obtained.

31. The computer-readable recording medium of claim 26, further comprising an instruction to derive the preliminary compression target data amount from the predetermined target data amount.

32. The computer-readable recording medium of claim 31, wherein the preliminary compression target data amount also is derived from a ratio between data amounts of the picture image and the reduced-size picture image.

33. The computer-readable recording medium of claim 26, wherein the preliminary compression target data amount is less than the predetermined target data amount.

34. A method for compressing a data amount of picture image data of a picture image acquired by an image pickup device, to a predetermined target data amount, comprising:
    creating a reduced-size picture image from the picture image by reducing a number of picture elements of the picture image;
    compressing the reduced-size picture image to a preliminary compression target data amount related to the predetermined target data amount by transforming the reduced-size picture image, quantizing the transformed reduced-size picture image, and coding the quantized reduced-size picture image; and compressing the picture image to the predetermined target data amount by transforming the picture image, quantizing the transformed picture image, and coding the quantized picture image;

wherein compressing the reduced-size picture image comprises deriving a compression level of the picture image, based on a compression ratio when the reduced-size picture image is compressed to the preliminary compression target data amount; and wherein compressing the picture image comprises compressing the picture image to the predetermined target data amount, based on the derived compression level.

35. A method for compressing a data amount of picture image data of a picture image acquired by an image pickup device to a predetermined target data amount, comprising:

generating the picture image data from the picture image;

creating a reduced-size picture image from the picture image data by reducing a number of picture elements of the picture image data;

compressing the reduced-size picture image to a preliminary compression target data amount related to the predetermined target data amount by transforming the reduced-size picture image, quantizing the transformed reduced-size picture image, and coding the quantized reduced-size picture image; and compressing the picture image to the predetermined target data amount by transforming the picture image, quantizing the transformed picture image, and coding the quantized picture image;

wherein compressing the reduced-size picture image comprises deriving a compression level of the picture image, based on a compression ratio when the reduced-size picture image is compressed to the preliminary compression target data amount; and wherein compressing the picture image comprises compressing the picture image to the predetermined target data amount, based on the derived compression level.

* * * * *